(12) United States Patent
Fujita et al.

(10) Patent No.: US 7,924,672 B2
(45) Date of Patent: Apr. 12, 2011

(54) OPTICAL-DISK RECORDING MEDIUM, PLAYING APPARATUS AND METHOD FOR SAME, AND RECORDING APPARATUS AND METHOD FOR SAME

(75) Inventors: Goro Fujita, Kanagawa (JP); Takashi Shimouma, Kanagawa (JP); Jun Nakano, Tokyo (JP); Shigeki Takagawa, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 11/815,630

(22) PCT Filed: Feb. 7, 2006

(86) PCT No.: PCT/JP2006/302069
§ 371 (c)(1),
(2), (4) Date: Aug. 6, 2007

(87) PCT Pub. No.: WO2006/082980
PCT Pub. Date: Aug. 10, 2006

(65) Prior Publication Data
US 2009/0010115 A1 Jan. 8, 2009

(30) Foreign Application Priority Data

Feb. 7, 2005 (JP) ................................. 2005-030272
Jul. 14, 2005 (JP) ................................. 2005-205439

(51) Int. Cl.
*G11B 7/00* (2006.01)
(52) U.S. Cl. ................................. 369/53.21; 369/47.21
(58) Field of Classification Search ........................ None
See application file for complete search history.

(56) References Cited

U.S. PATENT DOCUMENTS 6,826,137 B1 * 11/2004 Lee et al. .................... 369/53.21

(Continued)

FOREIGN PATENT DOCUMENTS

EP 0802527 11/1996

(Continued)

OTHER PUBLICATIONS

Japanese Office Action issued on Sep. 1, 2009, for corresponding Japanese Patent Application JP 2006-002906.

(Continued)

*Primary Examiner* — Joseph Haley
(74) *Attorney, Agent, or Firm* — K&L Gates LLP

(57) ABSTRACT

In an optical disk, a substrate has main data recorded in the form of a combination of pits and lands on one side thereof, and at least a reflective layer and cover layer are stacked on the substrate to cover the pits and lands on the substrate. To the optical disk, sub data is recorded in the form of marks formed by irradiating writing-power laser light to the reflective layer. The marks are formed so that reading signal level will be raised where the marks are formed while it will be lowered where the marks are formed in a counterfeit disk produced based on an authenticated disk, namely, the reading signal level where the marks are formed is different in polarity between in the authenticated and counterfeit disks. Further, in a player for the optical disk, discrimination is made between the authenticated and counterfeit disks by detecting the sub data recorded in the optical disk and judging whether the value of the detected sub data has been read at a correct polarity.

4 Claims, 23 Drawing Sheets

U.S. PATENT DOCUMENTS

| | | | |
|---|---|---|---|
| 7,061,850 B1 * | 6/2006 | Irie et al. | 369/59.24 |
| 2002/0163867 A1 * | 11/2002 | Kobayashi et al. | 369/53.21 |

FOREIGN PATENT DOCUMENTS

| | | |
|---|---|---|
| JP | 07-169187 | 7/1995 |
| JP | 2003-085771 | 3/2003 |
| JP | 2003-196836 | 7/2003 |
| JP | 2003-196837 | 7/2003 |
| JP | 3454410 | 7/2003 |
| JP | 2005-310269 | 11/2005 |
| WO | 01/08145 | 2/2001 |
| WO | WO 01/08815 | 2/2001 |

OTHER PUBLICATIONS

International Search Report dated May 23, 2006.

* cited by examiner

| Address | Recorded main data | Sub data |
|---------|-------------------|----------|
| 0000001 | 00011...11 | 1 |
| 0000002 | 11000...00 | 0 |
| 0000003 | 00111...11 | 0 |
| ... | ... | ... |

← Sub data

FIG.7

| Address | Recorded main data |
|---|---|
| 000001 | 00011···11 |
| 000002 | 11000···00 |
| 000003 | 00111···11 |
| ⋮ | ⋮ |

FIG.11

OPTICAL-DISK RECORDING MEDIUM, PLAYING APPARATUS AND METHOD FOR SAME, AND RECORDING APPARATUS AND METHOD FOR SAME

CROSS REFERENCE TO RELATED APPLICATIONS

The present application claims priority to Japanese Patent Document Nos. P2005-030272 filed on Feb. 7, 2005, and P2005-205439 filed on Jul. 14, 2005, the disclosures of which are herein incorporated by reference.

BACKGROUND

The present invention relates to an optical-disk recording medium in which main data is recorded in the form of a combination of pits and lands formed on one side of a substrate, a reflective layer and cover layer are stacked over the substrate side where the pits and lands are formed, sub data is recorded in the form of marks formed by irradiating laser light having a writing power to the reflective layer and the output level of a reading signal will be raised at the portions where the marks are formed, a playing apparatus and method for the optical-disk recording medium and a recording apparatus and method for recording sub data to the optical-disk recording medium.

The optical disks used to record information include the ROM (read-only memory). The ROM disk is widely used as a package medium over the world because many replica substrates thereof can be produced in a short time by injection molding of plastics with a stamper having pits and lands formed thereon in advance. Of the ROM disks of this type, CD (Compact Disk) and DVD (Digital Versatile Disk), for example, are widely used as recording media to record content information such as music, video, etc.

Disks having illegally copied thereto data recorded in a ROM disk sold as a package medium, so-called counterfeit disks, have ever been produced and prejudicial to the interests of a person having the regular copyright for the data in the ROM disk.

Generally, the counterfeit disks are produced by forming a stamper by mastering on the basis of signals read from an authenticated disk and replicating optical disks by the stamper, or by copying signals read from the authenticated disk to recordable disks.

Various techniques for copy prevention have been proposed heretofore to prevent such counterfeit information-recording media from being produced by those having no due right. One of such techniques is to append, for example, unique identification information to each of disks. There can be built a system in which unique identification information is appended to each disk with this technique, and a disk player reads the identification information and sends it to an external server via a network. Even if such counterfeit disks have been produced and distributed, the external server will detect a large amount of the same identification information and the system can thus detect that the counterfeit disks have been so produced and distributed. Further, the system can also identify a counterfeit disk maker or distributor by identifying a disk player having sent the detected identification information to the external server.

Even identification information unique to each authenticated disk should be recorded not to easily be copied as above by a commercially available disk drive, which will be useful for protection of the copyright for the main data in the disk.

On this account, it was proposed to record identification information to the reflective layer of the disk by forming marks which will cause the reflectance of the reflective layer to change. As disclosed in the Japanese Patent No. 3454410, main data such as content data, management information or the like is recorded in the form of a combination of pits and lands to the disk, while sub data as identification information is recorded by forming marks which will make a small change in reflectance of a portion, above the pits or lands, of the reflective layer.

The marks are recorded to the reflective layer of the optical disk by irradiating laser light higher in power than the reading laser light. The change in reflectance caused by the marks is so small that reading of the main data recorded in the form of a combination of pits and lands will not be influenced. Thus, the marks will not be read while the main data is being read.

It should be noted that to read the sub data itself, a separate playing system may be provided to sample many parts of the reading signal of the main data, each given the small change in reflectance, and integrate the samples, for example. In this case, positions where marks are to be inserted as sub data are determined between the sub data recorder and player according to a predetermined algorithm. Thus, in the authenticated disk player, it is possible to identify positions where the marks are to be recorded according to the similar algorithm to a one used for recording and thus read the identification information as the sub data accurately.

SUMMARY

In the foregoing, it has been described that a counterfeit disk is produced by illegally copying information in an authenticated ROM disk without any due right, namely, it is produced using the reading signals obtained by reading the authenticated ROM disk. However, a counterfeit disk can also be produced using a stamper prepared by transcribing the physical shape of the substrate of the authenticated ROM disk as it is.

More specifically, the latter technique is such that the cover layer and reflective layer of the ROM disk are separated from the substrate to expose pits and lands formed on the substrate and the concavities and convexities thus exposed on one side of the substrate are physically transcribed to copy information recorded on the disk.

The technique disclosed in the Japanese Patent No. 3454410 is such that marks are formed on a reflective layer of each optical disk to provide identification information unique to the optical disk. Seemingly, adoption of this method permits to prevent production of a counterfeit disk having information in an original disk illegally copied thereto since marks formed as identification information to each disk on the reflective layer cannot be transcribed in case the cover and reflective layers are separated from the substrate and a pattern of pits and lands formed on the substrate is physically transcribed to produce a replica disk.

To record marks as identification information to the reflective layer, it is necessary to irradiate laser light having a relatively high power to the reflective layer. When irradiated with such a high-power laser light, the temperature of the marks-recorded portion, for example, of the reflective layer will be higher and the substrate will thus be thermally expanded so that the disk itself will possibly be deformed.

That is to say, there is a possibility that the marks to be formed only on the reflective layer will physically be transcribed to the substrate, and with this physical transcription, the sub data is possibly copied along with the main data.

The recording of marks for identification of a disk to the reflective layer by irradiating laser light having a relative high power will be explained below with reference to FIGS. 1A and 1B.

FIG. 1A is a sectional view of an optical disk 100 including at least a substrate 101, reflective layer 102 and cover layer 103 and having the marks formed on the reflective layer 102.

In the optical disk 100, main data is recorded in the form of a combination of pits and lands being a concavity-convexity pattern to one side of the disk 100, and the reflective layer 102 and cover layer 103 are stacked on the disk side having the pits and lands formed thereon.

As having been described above, marks 110 as sub data are recorded by irradiating laser light to a portion, above the pits or lands, of the reflective layer 102 of the optical disk 100. In the example shown in FIG. 1A, the marks are recorded on a portion, above a predetermined land, of the reflective layer 102.

To record the marks as sub data, laser light having a relatively high power is irradiated to the reflective layer 102 as above, so that portion where the marks 110 are formed will have the temperature elevated due to the laser-light irradiation and the heat be transferred from the reflective layer 102 to the substrate 101. As a result, the substrate 101 will possibly be deformed partially due to thermal expansion or the like.

The deformation will lead to concavities 110a formed in portions of the substrate 101 which are in contact with the reflective layer 102 as shown in FIG. 1A. In this case, if the cover layer 103 and reflective layer 102 are separated from the substrate 101 and the substrate 101 is exposed at the side thereof where the pits and lands are formed, the concavities 110a seeming to correspond to the marks 110 to be formed only on the reflective layer 102 will be transcribed to the substrate 101 as shown in FIG. 1B. The concavities 110a corresponding to the marks transcribed to the surface of the substrate 101 will have a reflectance which is a little lower than that of the other lands.

Thus, a replica substrate, produced by physically transcribing the surface shape of the substrate 101 having formed on the surface thereof the concavities 110a corresponding to the marks 110 that should normally be formed only on a portion of the reflective layer 102, will have the marks, as sub data to be used as identification data unique to each disk, copied thereto as they are.

By stacking a reflective layer and cover layer on the replica substrate thus obtained as in the authenticated optical disk producing process, there will be produced many counterfeit disks having the main and sub data in an original authenticated optical disk copied thereto as they are.

It is therefore desirable to overcome the above-mentioned drawbacks of the related art by providing an optical-disk recording medium playing apparatus and method, capable of positively discriminating between an authentically produced optical disk and a replica disk produced by illegally copying the authenticated disk, a recording apparatus and method, for recording, to an optical-disk recording medium, sub data that permits to discriminate between an authenticated optical disk and a replica disk illegally replicated based on the authenticated disk, and an optical-disk recording medium having sub data recorded therein by the recording apparatus and method.

According to an embodiment of the present invention, there is playing apparatus for playing an optical-disk recording medium including a substrate having main data recorded in the form of a combination of pits and lands on one side thereof and at least a reflective layer and cover layer stacked on the substrate and to which sub data is recorded in the form of marks so formed on the reflective layer by irradiating writing-power laser light to the reflective layer that the level of a reading signal will be raised at portions where the marks are formed, the apparatus including a reading signal generator for generating a reading signal by detecting a return part, from the optical-disk recording medium, of reading-power laser light having been irradiated to the optical-disk recording medium.

The above apparatus further includes a sub data detector for detecting the level of the sub data on the basis of the result of detecting the value of the reading signal generated by the reading signal generator at a predetermined sampling point, and a judging unit for judging, based on the result of determining whether the sub data level having been detected by the sub data detector has a correct polarity, whether the optical-disk recording medium is an authenticated one.

According to another embodiment of the present invention, there is also provided a recording apparatus for recording sub data to an optical-disk recording medium including a substrate having main data recorded in the form of a combination of pits and lands on one side thereof and at least a reflective layer and cover layer stacked on the substrate by irradiating writing-power laser light to portions corresponding to predetermined-length lands formed on the optical-disk recording medium to form marks on the reflective layer correspondingly to the predetermined-length lands, the recording apparatus including a recording means for recording the sub data to the optical-disk recording medium so that each of the marks is formed to such a size and depth by irradiating the writing-power laser light that the level of a reading signal will be raised at the portions where the marks are formed but will be lowered at the mark-formed portions in an optical-disk recording medium produced by physically transcribing the substrate shape of the above optical-disk recording medium.

The above playing and recording apparatuses according to the present invention are compatible with the optical-disk recording medium in which main data is recorded on one side of a substrate in the form of a combination of pits and lands formed, a reflective layer and cover layer are stacked over the substrate side where the pits and lands are formed, and sub data is recorded in the form of marks formed by irradiating laser light having a writing power to the reflective layer.

As proved by the results of the experiments conducted on such an optical-disk recording medium included in the present invention, it is possible to produce an optical-disk recording medium having such a characteristic that the level of a reading signal will be raised at the portions where the marks are formed while the level will be lowered at the mark-formed portions in an optical-disk recording medium produced by physically transcribing the substrate shape of the above optical-disk recording medium. That is, the sub data can be so recorded as to have one polarity in an authenticated optical-disk recording medium while it will have a polarity opposite to the one polarity in any counterfeit optical-disk recording medium produced by illegally copying the authenticated one.

On this account, the above playing apparatus according to the present invention includes the determining unit that determines whether the sub data level has been detected at the correct polarity as above. That is, in case the sub data has the correct polarity, the optical-disk recording medium loaded in the playing apparatus can be judged to be a authenticated one. On the contrary, if the sub data polarity is not correct, the optical-disk recording medium loaded in the playing apparatus can be judged to be a counterfeit one.

As above, it was found that in case the marks are recorded on the lands, the reading signal level is raised in the authenticated disk but it is lowered in a counterfeit disk produced based on the authenticated disk. Also, it was found that it depends upon the size and depth of the marks whether the disk can be formed to have such a characteristic. Thus, in the recording apparatus according to the present invention, when the writing-power laser light is irradiated to the portion corresponding to the land having the predetermined length to form the marks on a portion, corresponding to the land, of the reflective layer, the sub data is recorded by irradiating the laser light to form the marks to such a size and depth that the reading signal level will be raised at the mark-formed portions of the authenticated disk, while it will be lowered at such mark-formed portions in a counterfeit disk produced based on the authenticated disk. By producing an optical-disk recording medium with the sub data recorded in the form of such marks, the polarity of the reading signal in the authenticated disk will be opposite to that in the counterfeit disk produced based on the authenticated disk.

Note that the "optical-disk recording medium produced by physically transcribing a substrate shape" referred to herein means an optical-disk recording medium produced by depositing a reflective layer on a replica substrate formed using a stamper prepared by physically transcribing a substrate shape and also an optical-disk recording medium produced by depositing a reflective layer on a substrate from which the original reflective layer has been removed by separation.

According to the present invention, it is possible to produce an optical-disk recording medium having sub data recorded therein in the form of marks so that the reading signal level that will be raised at the portions where the marks are formed will be lowered in a counterfeit disk produced based on the authenticated disk. Thus, the level of the sub data read from the authenticated optical-disk recording medium will be opposite in level to that of the sub data read from the counterfeit disk. As a result, discrimination can be made between the authenticated optical-disk recording medium and a counterfeit one to protect content data included in main data as a copyrighted article recorded in an authenticated optical-disk recording medium.

Also, the playing apparatus and method is adapted according to the present invention to judge whether an optical-disk recording medium loaded in the apparatus is a authenticated once by determining whether the level of sub data detected from the optical-disk recording medium has a correct polarity, and also read only content data recorded in the authenticated recording medium, whereby a copyrighted article recorded in the optical-disk recording medium can be protected.

Additional features and advantages of the present invention are described in, and will be apparent from, the following Detailed Description and the Figures.

BRIEF DESCRIPTION OF THE FIGURES

FIG. 7 shows the data structure of a data content to be stored in the sub data recorder.

FIG. 11 shows the data structure of a data content to be stored into the player as the embodiment of the present invention;

DETAILED DESCRIPTION

Figure 1:
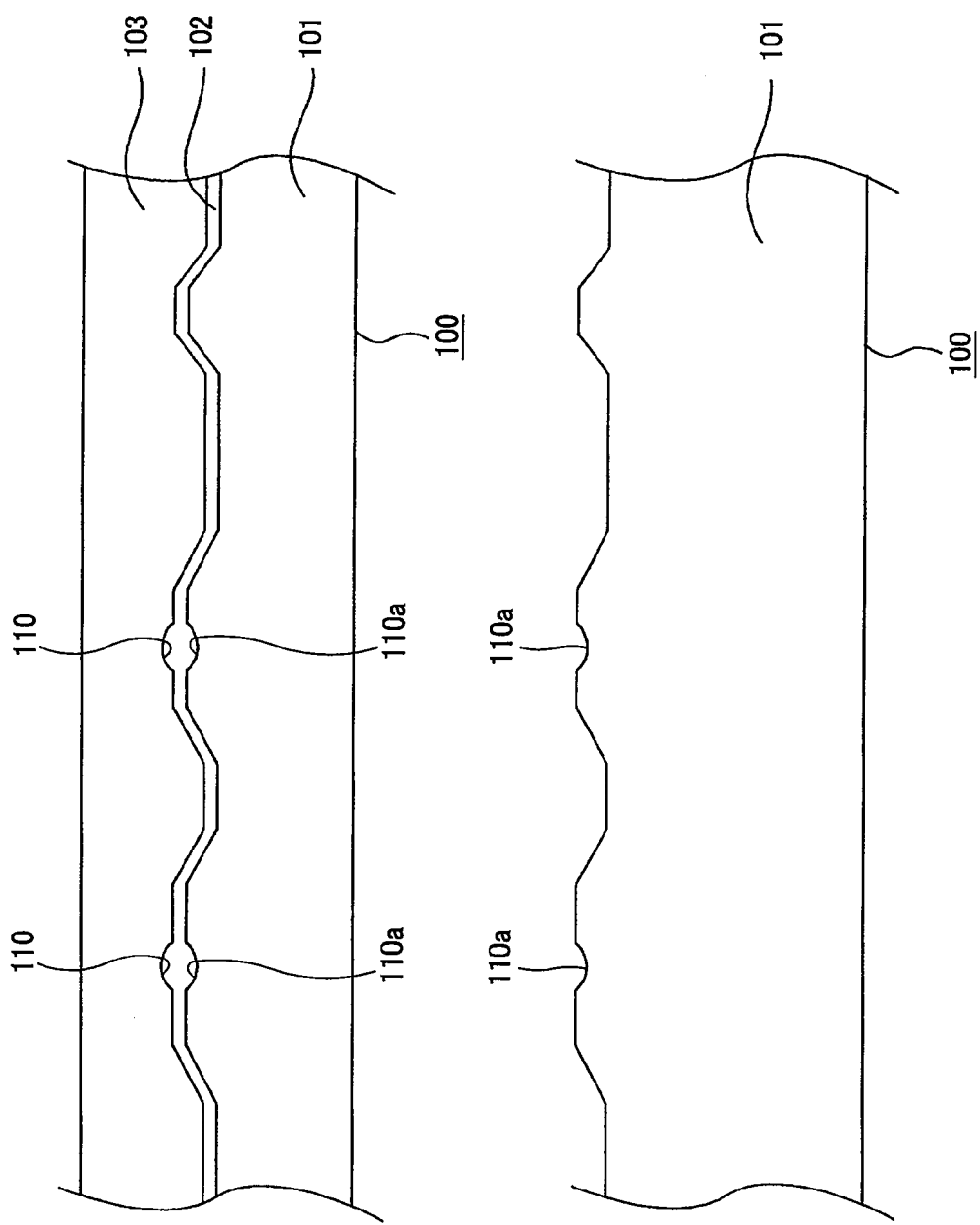
FIG. 1A is a sectional view of an optical disk, showing marks formed as sub data at portions, above predetermined lands, of a reflective layer of the optical disk.
FIG. 1B is a sectional view of a substrate of the optical disk with the reflective layer and cover layer being omitted.

The present invention will be described in detail below concerning the embodiments thereof with reference to the accompanying drawings. It should be noted that the present invention will be described concerning the following subjects:

1. Optical-disk recording medium
2. Sub-data recorder
3. Player
4. Optical-disk recording medium, recorder and player as embodiments 1. Optical-Disk Recording Medium First, an optical disk will be described as one embodiment of the optical-disk recording medium according to the present invention. The optical disk, generally indicated with a reference numeral 100, is of a ROM (Read-Only Memory) type. More particularly, it is formed based on a disk structure and format complying with the standard for a disk called "Blue-Ray Disk (trademark)" in which a light beam of 405 nm in wavelength is used to write or read information signals.

Figure 2:
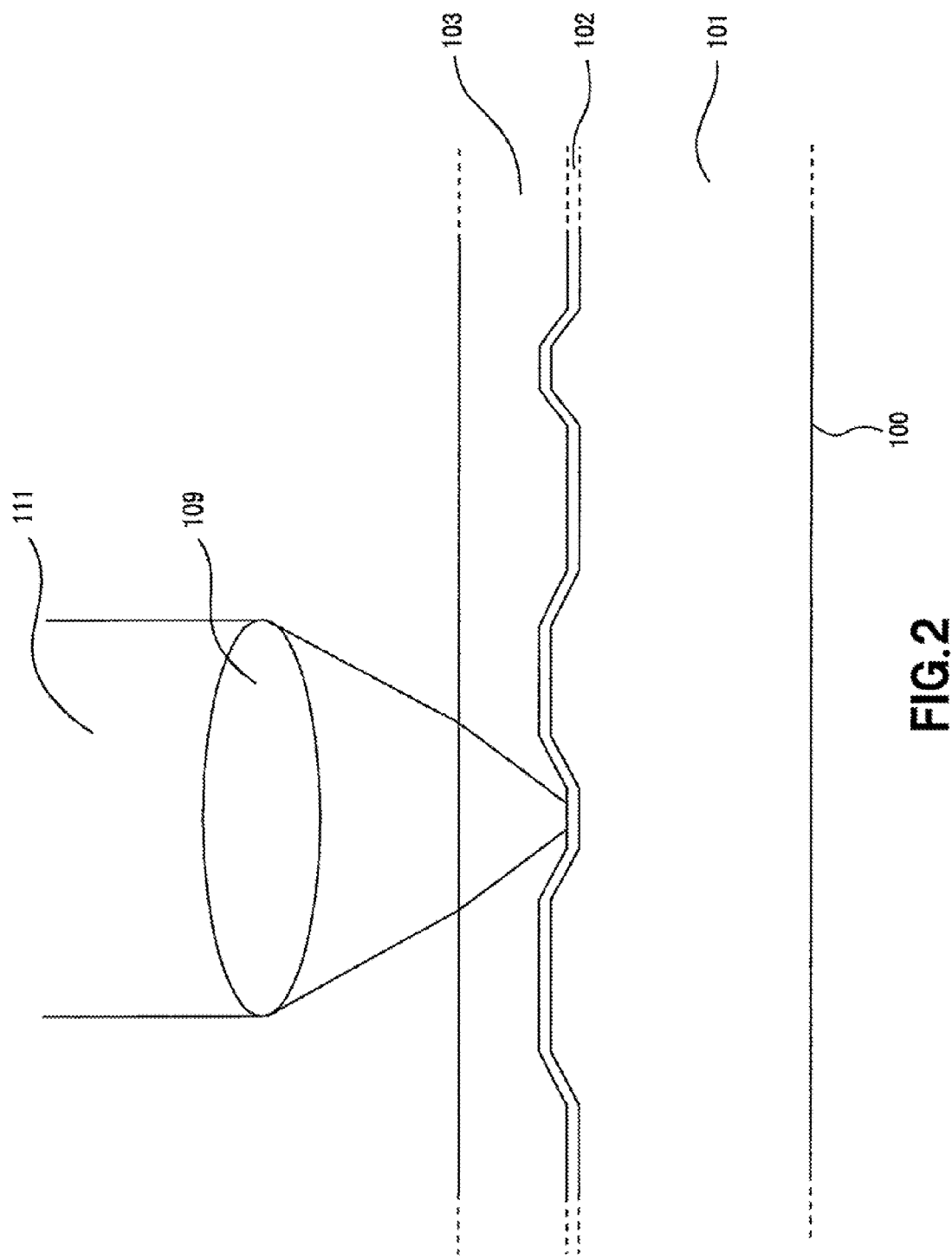
FIG. 2 is a sectional view of an optical-disk recording medium as an embodiment of the present invention.

As shown in FIG. 2, the disk 100 includes a substrate 101, reflective layer 102 stacked on one side of the substrate 101 and a cover layer 103 stacked on the reflective layer 102. The substrate 101 is formed from a synthetic resin such as polycarbonate. The substrate 101 has a pattern having a concavo-convex section formed on the side thereof on which the reflective layer 102 is formed. The portion having the concave section is called "pit" while the portion having the convex section is "land".

The disk 100 shown in FIG. 2 has information recorded thereon in the form of a combination of such a pit and land, more specifically, as a pit length and land length.

The reflective layer 102 is stacked on the side of the substrate 101 where the pits and lands are formed. Further, the cover layer 103 made of polycarbonate or the like is stacked on the reflective layer 102.

Since the reflective layer 102 is thus stacked on the substrate 101, it will have a concavo-convex section corresponding to the shapes of the pits and lands formed on the one side of the substrate 101. Also, the reflective layer 102 is formed from a metal film, for example, to provide return light corresponding to the concavo-convex pattern when laser light 111 focused by an objective lens 109 on the reflective layer 102 is irradiated through the cover layer 103 as shown in FIG. 2. At a sub data recorder 50 and player 1, which will further be described later, information recorded in the form of a combination of pits and lands is detected on the basis of a return part, from the reflective layer 102, of the irradiated laser light.

Figure 3:
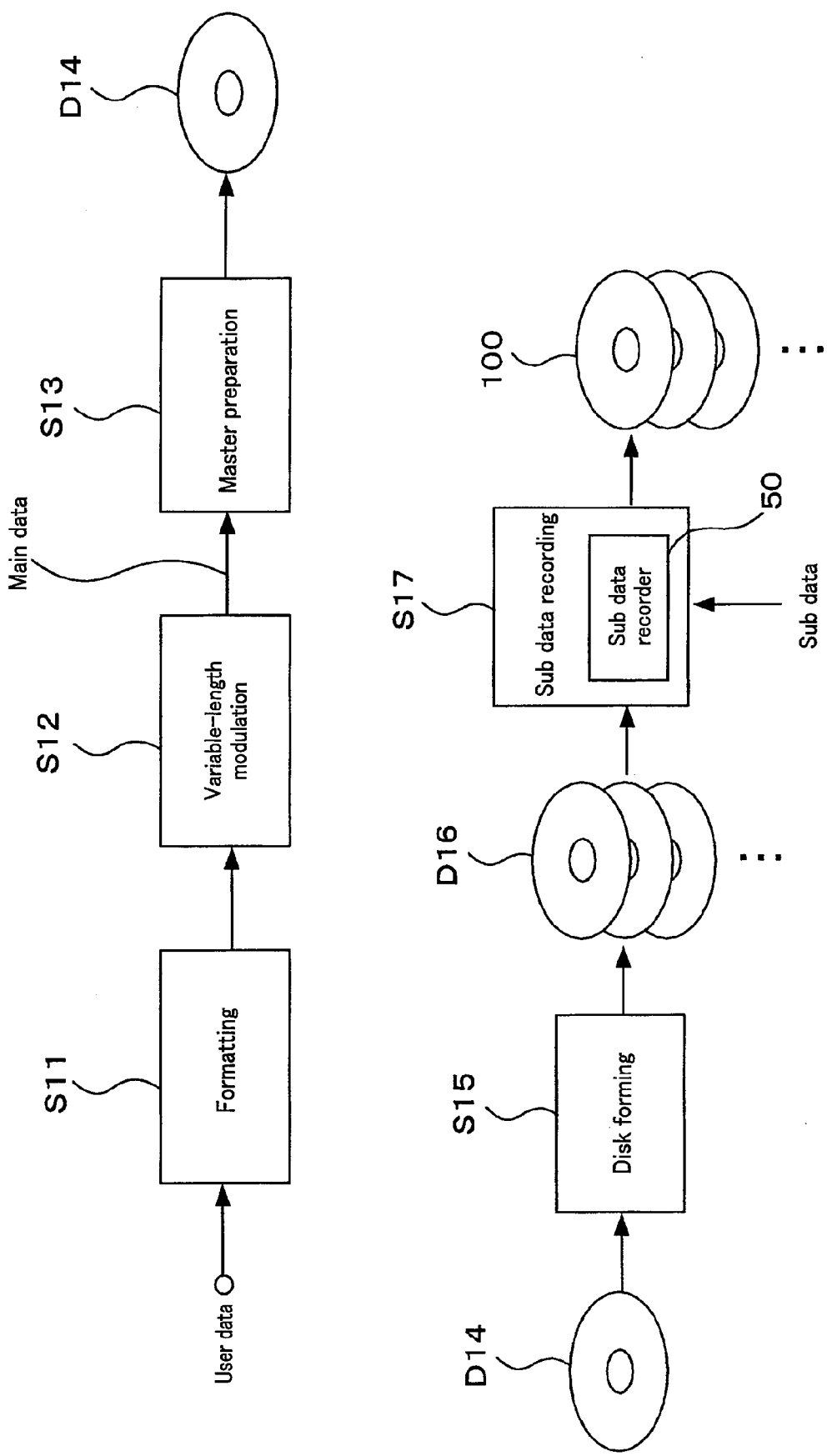
FIG. 3 explains an example of the process of producing the optical-disk recording medium as the embodiment of the present invention.

FIG. 3 explains the process of producing the disk 100 shown in FIG. 2.

To produce the disk 100, formatting is first done in step S11 as shown in FIG. 3. The formatting step S11 is done using a computer or the like.

In step S11, content (user data) to be recorded to the disk 100 is converted into a format data row conforming to a predetermined standard. According to this embodiment, the conversion is made to provide a data row conforming to the standard for on optical disk or Blue-Ray Disk (trademark) in which information is written or read using a light beam of 405 nm in wavelength as will be explained with reference to FIG. 4. It should be noted that actually, an error detection code and error correction code are appended to the user data, and the user data is subjected to interleaving and other processing.

Variable-length modulation is made in step S12. The data row resulted from the formatting in step S11 is subjected to a variable-length modulation. According to this embodiment, the data row is subjected to RLL (1, 7) PP (Parity Preserve/Prohibit, RLL: Run Length Limited) modulation and NRZI (Non-Return to Zero Inverse) modulation. A pattern of "0" and "1" of the data row, resulted from the variable-length modulation in step S12, becomes a pattern of pits and lands actually formed on the disk 100.

The data resulted from the formatting and variable-length modulation of the user data will be referred to as "main data" herein.

Next in step S13, a master is prepared using a mastering apparatus.

In step S13, photoresist is first applied to a glass substrate. Then, laser light corresponding to the main data resulted from the variable-length modulation in step S12 is irradiated to the glass substrate having the photoresist applied thereon as above while the latter is being rotated, to thereby form a concavo-convex pattern along a recording track. That is, pits and lands are formed.

Next, the photoresist having the pits and lands formed therein is developed for fixation to the glass substrate, and electrolytic plating is made on the surface of the glass substrate to form a metallic master D14 as shown.

The metallic master D14 thus formed is used to form a disk in step S15.

In step S15, a stamper is first formed based on the metallic master D14. Then, the stamper is placed in a mold and an injection molding machine is used to form the substrate 101 by injecting a light-transparent synthetic resin such as polycarbonate, acrylic or the like. On the substrate 101 formed here, there will be formed pits and lands corresponding to the main data resulted from the variable-length modulation in step S12 along a recording track.

Then, the reflective layer 102 is first stacked, by deposition, on the side of the substrate 101 where the pits and lands are formed, and the cover layer 103 is stacked on the reflective layer 102. Thus, there is first formed a disk having only the main data recorded thereon (main data-recorded disk) D16.

Next, sub data is recorded in step S17. In this step, sub data is recorded in addition to the main data recorded in the form of the pit-and-land pattern as above.

In this case, serial number information unique to each disk 100 (disk D16) is to be recorded as the substantial part of the sub data. That is, identification information (serial number) unique to the disk 100 will be appended to each disk 100 having the sub data recorded thereon as in step S17 above.

Also, an error correction code is also appended as the sub data in addition to the identification information as the substantial data. Appending of the error correction code permits error correction of the identification information during information reading.

By irradiating laser light having a writing power to the reflective layer 102, marks are recorded are the sub data in positions on the reflective layer 102, corresponding to predetermined positions in a specific section of the main data recorded in the form of the pit-and-land pattern, as will be described in detail later.

Figure 5:
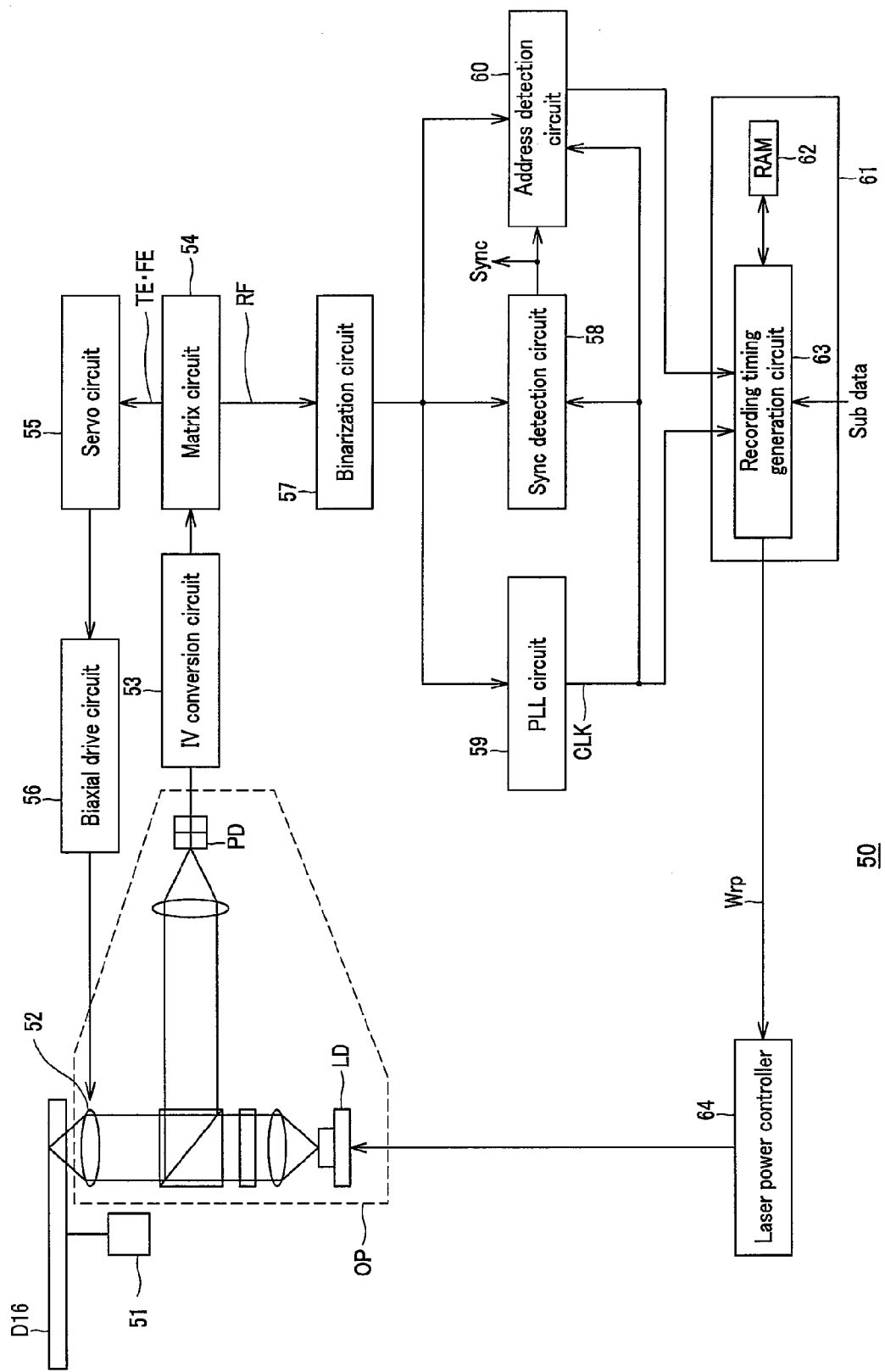
FIG. 5 is a schematic block diagram of a sub data recorder used to record sub data to the optical-disk recording medium as the embodiment of the present invention.

In step S17, the sub data recording is made by the sub data recorder 50 configured as shown in FIG. 5.

Note that in this case, the sub data includes only the identification information and error correction code. However, other data may additionally be included in the sub data.

Figure 4:
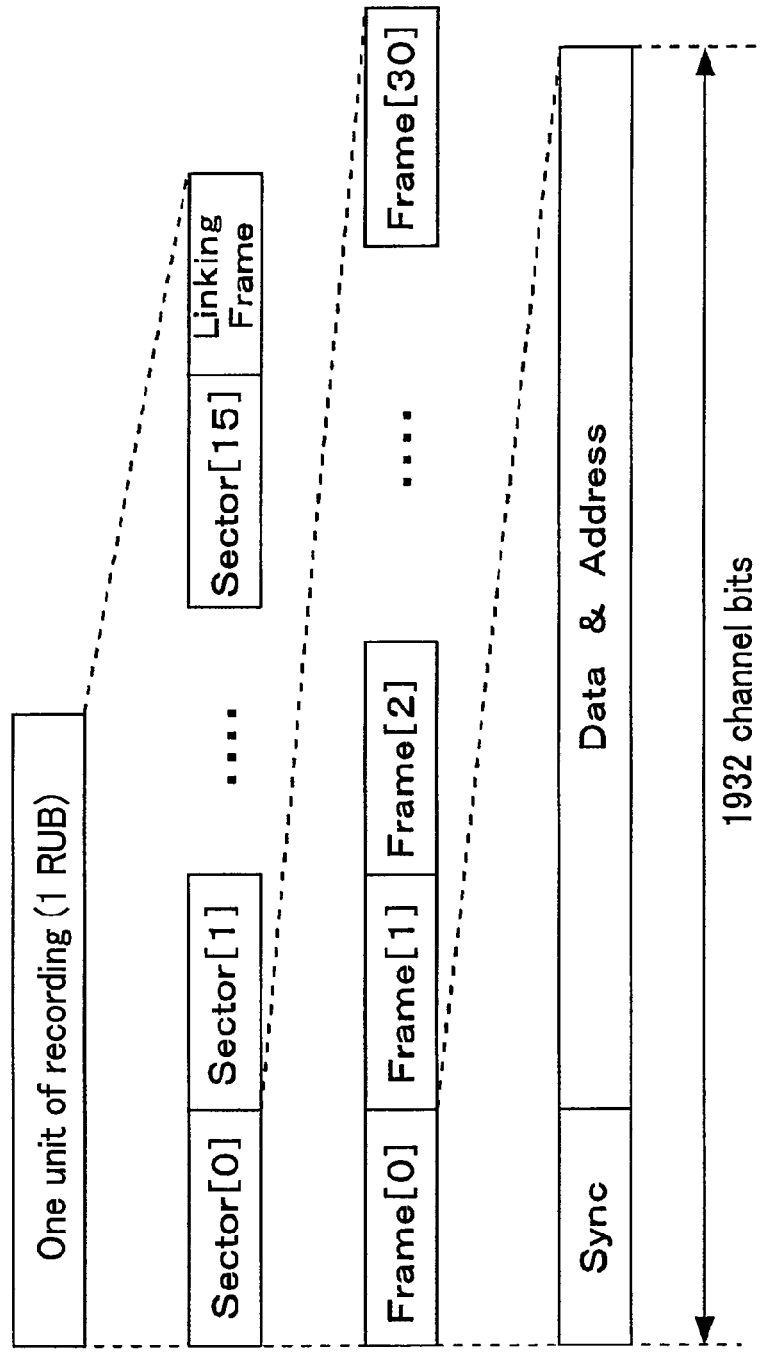
FIG. 4 explains the data structure of main data to be recorded to the optical-disk recording medium as the embodiment of the present invention.

FIG. 4 illustrates the data structure of the main data recorded to the disk 100 produced in the aforementioned process shown in FIG. 3.

First, one unit of recording called "RUB" is defined as shown in FIG. 4. One RUB includes 16 address units ("sector" as shown) and two linking frames. Each linking frame is provided as a buffer area between RUBs.

In this case, one sector forms one address unit. Each of the address units consists of 31 frames as shown in FIG. 4. One frame is formed from data of 1932 channel bits. In the Blue-Ray Disk (trademark) referred to as an example in this embodiment, since the main data conforms to the RLL (1, 7) PP modulation rule, so the numbers of codes "0" and "1" in succession, that is, a pit length and land length, are limited in length each to 2T (channel bits) to 8T.

A succession of codes of 9T not conforming to the modulation rule is inserted in "Sync" at the top of each frame and used for detection of a frame sync signal at the time of playing the disk.

2. Sub Data Recorder

Next, the sub data recorder 50 to record the aforementioned sub data to the disk D16 is will be described below with reference to FIG. 5.

As having been described above, the sub data is identification information unique to each disk 100. Therefore, the sub data recorder 50 operates to record sub data different in pattern from one disk 100 loaded in the sub data recorder 50 to another.

Also, the sub data is to be recorded in a predetermined section on the disk D16 and marks are to be formed as sub data in predetermined positions in the predetermined section. The sub data recorder 50 is designed to record the marks in such predetermined positions.

To record sub data by the sub data recorder 50 shown in FIG. 5, the disk D16 is first placed on a turntable (not shown) and a spindle motor 51 is put into rotation to rotate the disk D16 along with the turntable. The recording area of the disk D16 being thus rotated is canned by an optical pickup OP to read a recording signal (main data) recorded in the disk D16.

As shown, the optical pickup OP includes a laser diode LD as a laser source, objective lens 52 to condense and focus laser light emitted from the laser diode LD to the recording surface of the disk 100, photodetector PD to detect a return part of the irradiated laser light from the disk D16, etc.

The return light detected by the photodetector PD provided in the optical pickup OP is converted by an IV conversion circuit 53 into an electrical signal, and the electrical signal is supplied to a matrix circuit 54. The matrix circuit 54 generates a reading signal RF, tracking error signal TE and focus error signal FE on the basis of the return light supplied from the IV conversion circuit 53.

A servo circuit 55 is also included in the sub data recorder 50 to control a tracking drive signal TD and focus drive signal FD supplied from a biaxial drive circuit 56 also included in the sub data recorder 50 on the basis of the tracking error signal TE and focus error signal FE supplied from the matrix circuit 54. The tracking drive signal TD and focus drive signal FD are supplied to a biaxial actuator (not shown) supporting the objective lens 52 movably in a focusing direction parallel to the optical axis of the objective lens 52 and in a tracking direction perpendicular to the focusing direction. Thus the objective lens 52 is moved in the focusing and tracking directions on the basis of these signals TD and FD.

In a tracking/focusing servo system including these servo circuit 55, biaxial drive circuit 56 and biaxial actuator, the servo circuit 55 provides, based on the tracking error signal TE and focus error signal FE, such a control that a beam spot of the laser light irradiated to the disk D16 will trace a train of pits (recording track) formed on the disk D16 and be kept accurately focused.

The sub data recorder 50 further includes a binarization circuit 57. The reading signal RF generated by the matrix circuit 54 is supplied to a binarization circuit 57 also included in the sub data recorder 50 and in which it will be converted into a binary data "0" or "1". The binary data is supplied to a sync detection circuit 58 and PLL (Phase-Locked Loop) circuit 59.

The PLL circuit 59 generates a clock CLK synchronous with the supplied binary data, and supplies it as an operation clock to each appropriate one of the system components. Especially, the clock CLK is used as an operation clock to the binarization circuit 57, and to a sync detection circuit 58, address detection circuit 60 and sub data generation circuit 61 which will be explained below.

The sync detection circuit 58 detects, in the supplied binary data, a sync pattern to be inserted into each frame shown in FIG. 4. More specifically, the sync detection circuit 58 detects a 9T section which is taken as the sync pattern to detect frame synchronization. The frame sync signal is supplied to each appropriate one of the system components including the address detection circuit 60 and others.

The address detection circuit 60 detects address information on the basis of the frame sync signal and supplied binary data. The detected address information is supplied to a controller (not shown) that controls the entire sub data recorder 50. In the controller, it will be used for seeking or the like. Also, the address information is supplied to a recording timing generation circuit 63 included in the sub data generation circuit 61.

Figure 6:
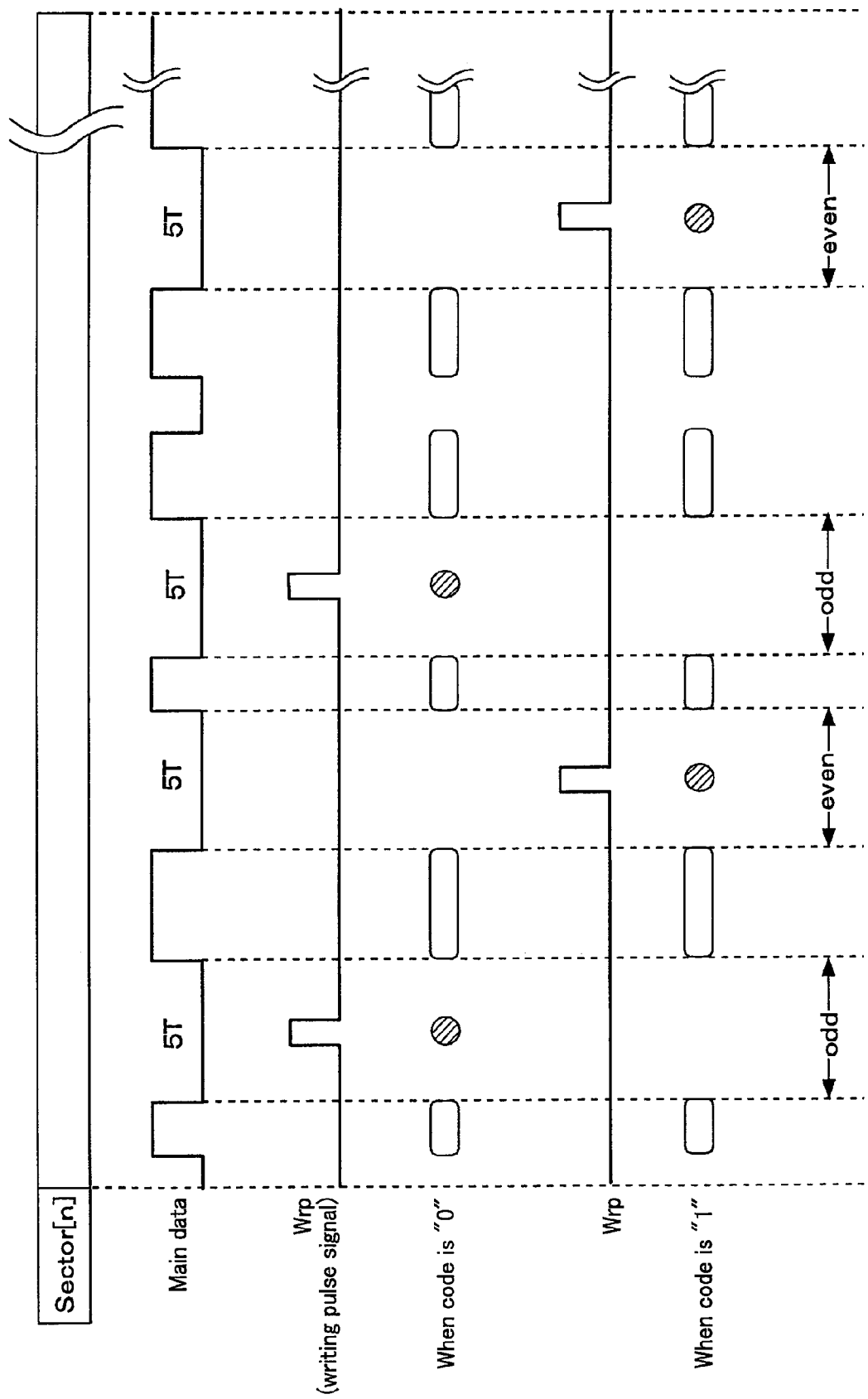
FIG. 6 explains the manner of sub data recording.

The sub data generation circuit 61 includes the recording timing generation circuit 63 and a RAM (Random-Access Memory) 62 as shown in FIG. 5. The sub data generation circuit 61 generates a writing pulse signal Wrp for recording sub data to be recorded to the disk D16 as shown in FIG. 6 on the basis of the supplied sub data, address information supplied from the address detection circuit 60 and a clock CLK supplied from the PLL circuit 59.

Note that the sub-data recording operation of the sub data generation circuit 61 will be explained in detail later.

A laser power controller 64 also included in the sub data recorder 50 controls the power of laser light emitted from a laser diode LD in the optical pickup OP on the basis of the writing pulse signal Wrp supplied from the sub data generation circuit 61. In this case, the laser power controller 64 controls the laser diode LD to emit laser light having a reading power when the writing pulse signal Wrp is at the L level. Also, it controls the laser diode LD to emit laser light having a writing power when the writing pulse signal Wrp is at the H level.

With irradiation of the writing-power laser light under the control of the laser power controller 64, marks will be recorded on the reflective layer 102. The marks on the reflective layer 102 will be sub data on the disk D16

FIG. 6 shows how sub data is recorded by the aforementioned sub data generation circuit 61. In FIG. 6, there are shown an example in which "0" is recorded as a code for each bit of sub data and an example in which "1" is recorded as a code for each such bit.

First, the code is represented by a set of an odd land and an adjacent even land, each of which has a predetermined length, of the lands formed as the main data. For each set of such odd and even predetermined-length lands, the code is defined as "0" when the mark is recorded on the odd land, while the code is defined as "1" when the mark is recorded on the even land.

In the examples shown in FIG. 6, the mark is recorded on a land of 5T. In this case, one sector which is one address unit is assigned as a section to be assigned for recording a code of one bit included in the sub data. That is, the mark is recorded on each set of odd and even lands adjacent to each other in one address unit to represent the same code as shown in FIG. 6.

Also, in case a code "0" is to be recorded, the mark is recorded only on the odd predetermined-length land in one address unit as shown.

Also, in case a code "1" is to be recorded, the mark is recorded only on the even predetermined-length land in one address unit.

Note that to read the sub data thus recorded, the reading signal RF is sampled at every set of the adjacent odd and even predetermined-length lands in one address unit and the value of the reading signal RF sampled at the even land is subtracted from the value of the reading signal RF sampled at the odd land ("odd–even" subtraction), which will be described in detail later.

Here will be considered an example in which the reading signal at the portions where the marks are recorded will be lower in level than the reading signal at the portions where no marks are recorded, as in the past. In case the code for the marks recorded only on even lands is "0", the "odd–even" subtraction will ideally provide a negative value at each of the adjacent predetermined-length lands. That is, integration of the "odd–even" subtraction value calculated at each set of adjacent predetermined-length lands will positively result in a negative value which can be detected.

On the contrary, in case the code for the mark recorded only on even land is "1", the "odd–even" subtraction will ideally provide a reading signal level having a positive value at each of the adjacent predetermined-length lands. Therefore, integration of the "odd–even" subtraction value will positively result in a reading signal level having a positive value which cannot be detected.

Note that since the disk 100 as the embodiment of the present invention is adapted such that the reading signal level is raised at the portions where the marks are formed as will further be described later, a reading signal level having the positive value will actually be detected in case the marks are recorded only on the odd lands while a reading signal level having a negative value will be detected in case the marks are recorded only on the even lands.

For the convenience of explanation, it is assumed here that sub data are recorded by the sub data recorder 50 in the same manner as in the past and the reading signal level will be lowered at the portions where the marks are formed.

Note here that since the same pattern of recording is repeated over the specific section as above and one value is judged based on a plurality of such same recording patterns at the time of reading the sub data as having been described above, so it suffices that the change in reflectance of the reflective layer due to the mark recording is small. Because the change in reflectance due to the mark recording can be limited to a small one, the binarization of the main data can be prevented from being influenced by the recorded marks.

Also for other codes in the sub data, marks are recorded in the similar manner to the above-mentioned one. In this case, the sub data will be recorded over as many address units as the codes included in the sub data.

For recording the other codes in the sub data, a section where the sub data is to be recorded (will be referred to as "sub-data recording section" hereunder) is determined in advance between the sub data recorder 50 and a player. Therefore, the sub data recorder 50 is designed to record the aforementioned marks over a plurality of address units as the sub-data recording section thus predetermined.

Concerning the aforementioned recording technique, it should be reminded here that if a mark to be recorded on a predetermined-length land is recorded on an edge, the main data will not possibly be binarized accurately. That is, if the mark is recorded on the edge portion of the predetermined-length land, the mark-recorded portion will correspondingly be decreased in reflectance so that a wrong land length (or pit length) will possibly be detected during binarization.

On this account, the mark is to be recorded at the center of the land on which the mark is to be recorded. Thus, since the edge portion can authentically be obtained, so the binarization will not be influenced in this respect as well.

For the aforementioned recording operation, the recording timing generation circuit 63 in the sub data generation circuit 61 shown in FIG. 5 is designed to generate a writing pulse signal Wrp at a time as shown in FIG. 6. That is, for the code "0", the recording timing generation circuit 63 generates a writing pulse signal Wrp that takes the H level only at the center of the odd predetermined-length land. Also, for the code "1", the recording timing generation circuit 63 generates a writing pulse signal Wrp that takes the H level only at the center of the even predetermined-length land.

Figure 8:
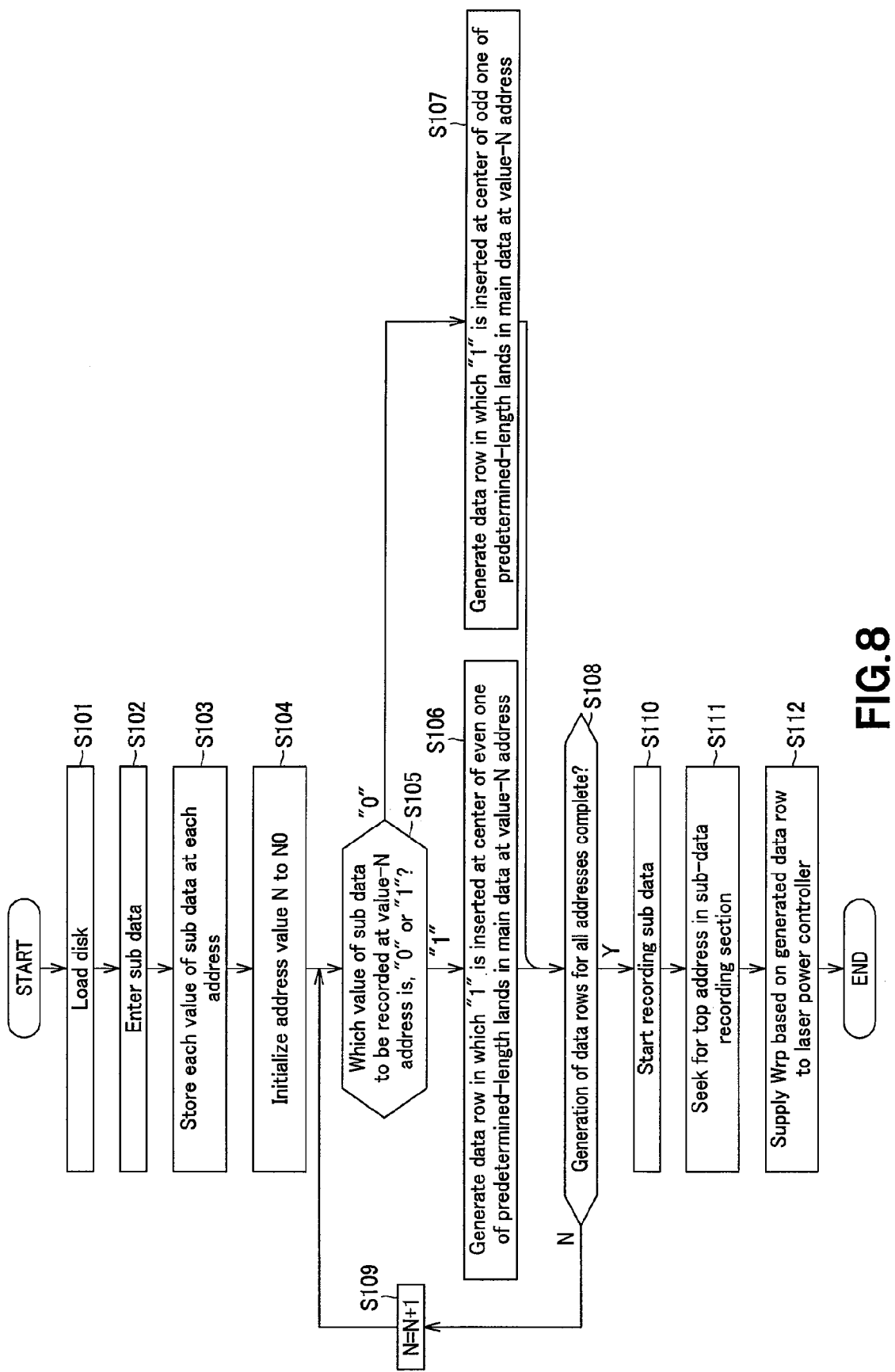
FIG. 8 shows a flow of operations made in recording the sub data by the sub data recorder.

The system configuration and operations for implementing the aforementioned technique of recording will be described below with reference to FIGS. 7 and 8.

First, the sub data is recorded in a predetermined sub-data recording section on the disk D16. In the predetermined sub-data recording section, marks are recorded only on the odd or even predetermined-length lands in each address unit as above. For this recording, it is necessary to know the content of main data in each address unit in such a sub-data recording section.

On this account, the content of main data in each address unit in the sub-data recording section will be pre-stored in the RAM 62 in the sub data generation circuit 61 shown in FIG. 5.

FIG. 7 shows the data structure in the RAM 62.

First, the address shown indicates address information on each address unit in the sub-data recording section. The content of main data recorded in each address unit is stored at each address.

It should be reminded that the sub data recorder 50 is to be managed by the maker of the disk D16 (disk 100). Therefore, it is possible to know in advance that the content of main data to be recorded to the disk D16 which is a ROM disk. Thus, the content of main data to actually be recorded to the disk D16 can be pre-stored in the RAM 62 correspondingly to an address as above.

Further, each value of sub data to be recorded (assigned) by the recording timing generation circuit 63 in the RAM 62 correspondingly to an address. Each value of the sub data is stored by the recording timing generation circuit 63 into the RAM 62. The recording timing generation circuit 63 sequentially stores each value of sub data supplied from outside into the RAM 62 starting at the top address of the sub-data recording section.

Thus, the recording timing generation circuit 63 can identify predetermined-length lands in the main data according to the content of data to be stored into the RAM 62, and also the odd and even ones of the predetermined-length lands.

In addition, referring to the value of sub data stored at a corresponding address as above, the recording timing generation circuit 63 can identify on which of the predetermined-length lands thus identified a mark should be inserted, the odd or even one.

More specifically, in case the value stored in association with an address is "0", a mark is to be inserted on the odd predetermined-length land in an address unit including that address as shown in FIG. 6. On the other hand, if the value is "1", the mark is to be inserted on the even predetermined-length land.

Further, in this case, the mark is to be inserted at the center of the land on which the sub data is to be recorded as above. Therefore, the sub-data recording land is identified, and then a writing pulse signal Wrp is generated which will take the H level at a time when the mark is recorded at the center of that land.

More specifically, such a writing pulse signal Wrp is first generated by preparing "ALL 0" data including all channel bits in one address unit. Then, a data row in which the code "1" has been inserted at a time (bit position) identified as above should be generated for the "ALL 0" data. Namely, there is generated a data row for one address unit, in which "1" stands only in a bit position in which the mark is to be inserted and "0" stands in all other bit positions.

Based on such a data row, the recording timing generation circuit 63 can supply the laser power controller 64 with a writing pulse signal Wrp that will take the H level only at a time when a correct mark recording position as shown in FIG. 6 is reached.

Sub data is recorded by the sub data recorder 50 as will be described in detail below with reference to the flow diagram shown in FIG. 8.

First in step S101, the disk D16 is loaded into the sub data recorder 50. Also, sub data is supplied to the sub data recorder 50 in step S102. The sub data supplied to the sub data recorder 50 is supplied to the sub data generation circuit 61 as shown in FIG. 5.

As having been described above, the sub data thus supplied to the sub data recorder 50 includes identification information unique to each disk D16 (disk 100) and error correction code.

Note that although the sub data is supplied to the sub data recorder 50 after the disk 100 is loaded into the latter as above, it may be supplied to the sub data recorder 50 before the disk 100 is loaded into the latter.

In step S103, each value of the sub data is stored at a corresponding address. That is, the operation made in step S103 is equivalent to the aforementioned operation of the recording timing generation circuit 63 in the sub data generation circuit 61 to store each value of the supplied sub data at a corresponding address in the RAM 62 constructed as shown in FIG. 6.

In step S104, an address value N is initialized to a value N0. In step S104, the recording timing generation circuit 63 initializes an internal counter to the value N0 in order to generate a data row at each address as will be described below.

In step S105, the value of sub data to be recorded at the address having the value N is discriminated. More particularly, in step S105, the recording timing generation circuit 63 discriminates between ones "0" and "1", associated with corresponding addresses based on the counts in the above counter, of the sub data values stored at corresponding addresses in the RAM 62.

In case the sub data value is determined to be "1", the recording timing generation circuit 63 generates a data row in which "1" is inserted at the center of the even one of predetermined-length lands in the main data at the address having the address N (in step S106). Thus, as a data row including all channel bits in one address unit, there is thus generated a data row in which only the code corresponding to the center of the even predetermined-length land is "1" while all other codes are "0".

On the other hand, in case the sub data value is determined to be "0", the recording timing generation circuit 63 generates a data row in which a data in which "1" is inserted at the center of the odd one of predetermined-length lands in the main data at the address having the value N (in step S107). Thus, as a data row including all channel bits in one address unit, there is thus generated a data row in which only the code corresponding to the center of the odd predetermined-length land is "1" while all other codes are "0".

As seen from the foregoing explanation, the recording timing generation circuit 63 can generate such a data row by identifying an even or odd predetermined-length land and a bit position which is the center of the land on the basis of the content of the main data stored in each corresponding address in the RAM 62.

After generating the data row including all channel bits in one address unit, the recording timing generation circuit 63 judges in step S108 whether generation of data rows for all addresses is complete. That is, the recording timing generation circuit 63 judges whether generation of the data rows is complete for all the addresses (sectors) in the sub-data recording section. The operation in step S108 is effected depending upon the result of judgment, made by the recording timing generation circuit 63, of whether the internal counter having been initialized to the value N0 in step S104 has reached a preset predetermined count.

If the result of judgment is negative, namely, if the internal counter has not yet reached the predetermined count, the address value N is incremented by one (in step S109) and then the recording timing generation circuit 63 returns to step S105. Thus, the recording timing generation circuit 63 generates the data row for all the address units in the sub-data recording section.

In case the result of judgment in step S108 is affirmative, that is, if the internal counter has reached the predetermined count and generation of data rows for all the addresses is complete, the sub data starts being recorded in step S110.

In response to the start of sub data recording, seeking is first made for the top address in the sub-data recording section in the disk 100 in step S111. For example, the seeking in step S1 can be made by controlling appropriate system components on the basis of address information on a predetermined sub-data recording section by means of a controller for controlling the entire sub data recorder 50.

In response to the seeking for the top address in the sub-data recording section, the recording timing generation circuit 63 generates a writing pulse signal Wrp based on the data row generated for each address unit as in step S106 and S107, and supplies it to the laser power controller 64 (in step S112). The writing pulse signal Wrp based on the data row is generated based on the timing of the clock CLK for synchronization with the main data to be read.

Also, the writing pulse signal Wrp starts being supplied in response to supply of address information on the recording section as address information supplied from the address detection circuit 60.

The writing pulse signal Wrp generated by the recording timing generation circuit 63 on the basis of the data row will take the H level at a correct time as shown in FIG. 6. Therefore, with the laser power controller 64 switching the output of the laser diode LD from the reading power to writing power on the basis of the writing pulse signal Wrp, marks can be recorded in correct positions, corresponding to the value of the input sub data, on the disk D16.

Note that although it was described above that the sub data is supplied from outside, a circuit to generate a serial number for each disk D16 loaded into the sub data recorder 50 may be provided and sub data based on identification information supplied from the circuit may be stored in the RAM 62.

Also, sub data can be recorded to disks D16 having the same title and having main data equal in content to each other recorded therein while the main data to be stored in the RAM 62 is left unchanged in content, which has not been explained above. For recording sub data to disks D16 having different titles, however, it suffices to update the content of the main data to be stored into the RAM 62 correspondingly to the content of main data to be recorded into the disk D16.

3. Player

Next, the player 1 to play the disk 100 in which the sub data is recorded in the form of marks formed on the reflective layer 102 as above is constructed as will be described with reference to the schematic block diagram shown in FIG. 9.

Figure 9:
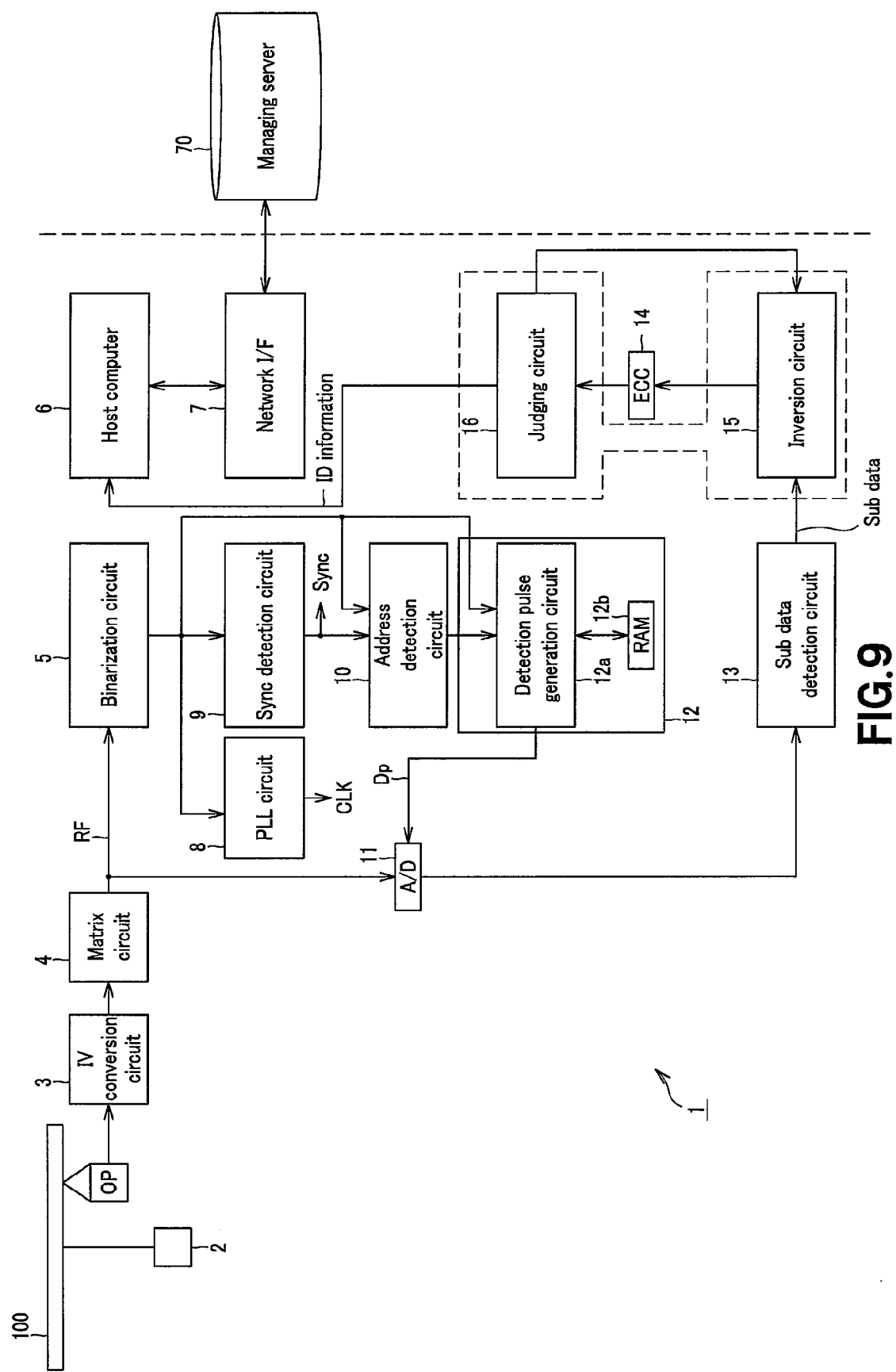
FIG. 9 is a schematic block diagram of a player as an embodiment of the present invention.

Note that FIG. 9 shows only a portion of the player 1 which is related mainly with the sub data reading with omission of the demodulation system provided downstream of the binarization post in the main data reading system.

Also, no explanation is made of the inversion circuit 15 and judging circuit 16 shown in a dashed-line block in FIG. 9.

In the player 1, the disk 100 placed on a turntable (not shown) is rotated by a spindle motor 2 along with the turntable in a predetermined rotation driving manner. The recording area of the disk D16 being rotated is scanned with laser light emitted from the optical pickup OP and return light from the disk D16 is detected to read recording signals (main data) recorded in the disk D16.

Also the optical pickup OP in this player 1 includes a laser diode as laser source, objective lens to condense and focus laser light on the recording surface of the disk 100, biaxial mechanism to support the objective lens movably in the tracking and focusing directions, photodetector to detect a return part of the laser light irradiated to the disk 100, etc.

Also, it should be noted that in the player 1, the laser light irradiated to the disk 100 has a reading power.

The return light information detected by the photodetector in the optical pickup OP is converted by an IV conversion circuit 3 into an electrical signal, and this electrical signal is supplied to a matrix circuit 4. The matrix circuit 4 generates a reading signal RF on the basis of the return light information supplied from the IV conversion circuit 3.

Also, the matrix circuit 4 also generates a tracking error signal TE and focus error signal FE (now shown). These signals are supplied to a servo circuit (not shown) in which they will be used for servo control of the tracking and focus of the objective lens.

The reading signal RF generated by the matrix circuit 4 is supplied to a binarization circuit 5 and also to an A-D converter 11 which will be explained in detail later.

The binarization circuit 5 converts the supplied reading signal RF into binary data "0" or "1". The binary data is supplied to a PLL circuit 8, sync detection circuit 9 and address detection circuit 10.

Also, the binary data is supplied to a detection pulse generation circuit 12a included in a detection pulse generator 12 which will further be described later.

The PLL circuit 8 generates a clock CLK synchronous with the supplied binary data, and supplies it as an operation clock to each of appropriate system components. Especially, the clock CLK is also supplied to the detection pulse generation circuit 12a (not shown).

The sync detection circuit 9 detects a sync part inserted from the supplied binary data into each frame shown in FIG. 3. More specifically, it detects a section of 9T as a sync pattern to detect frame synchronization.

The frame sync signal is supplied to appropriate system components including the address detection circuit 10.

The address detection circuit 10 detects address information in the supplied binary data on the basis of the frame sync signal. The detected address information is supplied to a controller (not shown) which controls the entire player 1. It is used in the controller for seeking etc. Also, the address information is supplied to the detection pulse generation circuit 12a in the detection pulse generator 12.

It should be noted for confirmation that the optical pickup OP, IV conversion circuit 3, matrix circuit 4, binarization circuit 5, PLL circuit 8, sync detection circuit 9 and address detection circuit 10, having been described above, are also used for reading the main data recorded in the disk 100. That is, to read the sub data, these components form together a main-data reading system.

The detection pulse generator 12 generates a detection pulse signal Dp indicative of a detection point corresponding to a mark recording method determined for common use between the player 1 and sub data recorder 50 in reading the identification information as the sub data.

The detection pulse generator 12 includes the detection pulse generation circuits 12a and a RAM 12b. The detection pulse detection circuit 12a generates the detection pulse Dp on the basis of the information stored in the RAM 12b. The detection pulse Dp thus generated is supplied to the A-D converter 11.

The A-D converter 11 is supplied with the reading signal RF from the matrix circuit 4. The A-D converter 11 samples the supplied reading signal RF at a time designated with the detection pulse signal Dp, and supplies the sampled value to a sub data detection circuit 13.

The sub data detection circuit 13 makes a predetermined calculation of the value supplied from the A-D converter 11 to detect each value of the sub data. That is, it will detect each of the sub data on the basis of the result of a calculation corresponding to the aforementioned "odd–even" subtraction, for example.

Note that the detection of sub data value made by the detection pulse generation circuit 12, A-D converter 11 and sub data detection circuit 13 will be described in detail later.

The sub data value detected by the sub data detection circuit 13 is supplied to an ECC (Error Correction Code) circuit 14. It should be noted that the explanation made herein is based on the assumption that the inversion circuit 15 and judging circuit 16 shown in a dash-line block are not provided.

In this case, the sub data includes the identification information and error correction code. The ECC circuit 14 reproduces the identification information by making error correction on the basis of the error correction code in the sub data.

The reproduced identification information is supplied to a host computer 6 shown in FIG. 9.

The host computer 6 designates various kinds of operations by supplying corresponding commands to a controller (not shown) to control the entire player 1. For example, the host computer 6 sends a command for reading of the main data recorded in the disk 100. The main data thus read from the disk 100 will be binarized by the binarization circuit 5, then subjected to modulation (RLL 1-7 PP modulation), error correction and the like in a demodulation system (not shown), and supplied to the host computer 6.

Also, a network interface 7 is provided for the host computer 6 to make data communications via a predetermined network. Thus, the host computer 6 can make data communications with an external device, especially, a managing server 70 shown in FIG. 9, via the predetermined network such as the Internet.

Note that the host computer 6 and managing server 70 in this embodiment will operate as will be described later.

In the player 50 constructed as above, the sub data is detected as will be described below with reference to FIG. 10.

Figure 10:
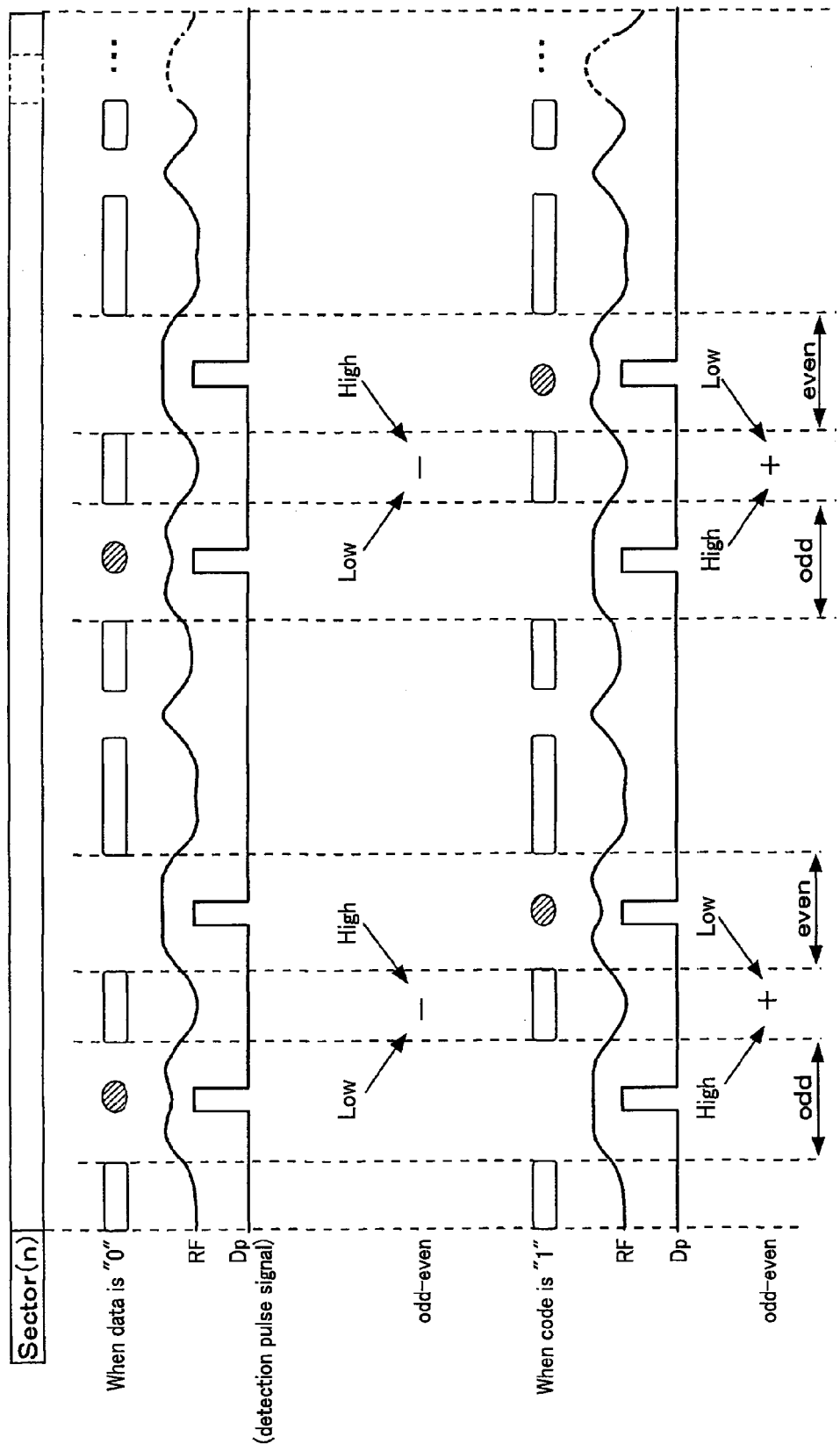
FIG. 10 explains the operation of sub data reading.

FIG. 10 shows an example of mark recording in which "0" is assigned as the value of one bit of the sub data to one address unit in the disk 100 and an example of mark recording in which "1" is assigned as the value of one bit of the sub data to one address unit. For the convenience of explanation, FIG. 10 shows the pits and lands formed as the main data in the same pattern.

First, the sub data is recorded with 1-bit information being assigned to each address unit in a predetermined sub-data recording section on the disk 100 as having previously been described.

A code is represented as will be described below. In case a mark is recorded on each of odd ones of the predetermined-length lands, the code is defined as "0". In case a mark is recorded on each of even ones of such lands, the code is defined as "1". That is, in case the code is "0" as shown, the mark is recorded only on each of the odd ones of the predetermined-length lands in the address unit. In case the code is "1", the mark is recorded only on each of the even ones of the predetermined-length lands in the address unit.

In the foregoing, the portion where the mark is recorded has been described herein as a portion of which the reflectance will be a little lowered. Thus, the waveform level of the reading signal RF is a little lowered at a portion where the mark is recorded, as shown.

In reading the sub data, the value of the reading signal level will be judged based on the small change in reflectance at the mark-recorded portion.

Note that each mark is to be recorded as sub data at the center of a predetermined-length land as having been described above. With the mark being recorded at the center of the land, the reading signal level is lowered only at the center of the mark-recorded land and the waveform of the reading signal RF at the edge is authentically obtainable as will be seen from the waveform of the reading signal RF shown in FIG. 10. Thus, the binarization of the main data can be prevented from being affected by the sub data recording.

As having been described above, when the code is "0", the value of the reading signal RF will only be lowered a little on the odd predetermined-length lands. On the other hand, when the code is "1", the level of the reading signal RF will only be lowered a little on the even predetermined-length lands.

Therefore, for judging each value of the sub data assigned to each address unit, it will suffice to detect on which of the predetermined-length lands in the address unit the reading signal RF is lowered in level, odd or even.

The level-lowering of the reading signal RF at the mark-recorded portion can be detected by determining a difference in level from the reading signal RF at a portion where no mark is recorded, for example.

It will be seen that when the code is "0", the marks are recorded only on the odd predetermined-length lands and that when the code is "1", the marks are recorded only on the even predetermined-length lands. In other words, it will be seen that whenever the code is "0", no marks have been recorded on the even predetermined-length lands and that whenever the code is "1", the marks have been recorded on the odd predetermined-length lands. Thus, by making the "odd–even" subtraction as to the reading signals RF at the adjacent odd and even predetermined-length lands, it can be examined on which of the odd and even predetermined-length lands the reading signal RF is lowered in level (whether the mark is recorded).

More specifically, when the result of the "odd–even" subtraction is a negative value, the reading signal RF at the odd predetermined-length lands is lowered in level, which means that the marks are recorded on the odd predetermined-length lands. On the contrary, when the result of the "odd–even" subtraction is a positive value, the reading signal RF at the even predetermined-length land is lowered in value, which means that the marks are recorded on the even predetermined-length land.

Actually, however, noise is superposed on the reading signal RF. As above, the fall in level of the reading signal RF at the mark-recorded portion is so small and thus will possibly be confused with the noise. Therefore, detection, based on the result of the "odd–even" subtraction, of the fall in level of the reading signal RF only at a set of adjacent odd and even predetermined-length lands is insufficient for positive judgment of the reading signal value.

On this account, the sub data is read by integrating the result of the "odd–even" subtraction made of the reading signal at each set of the adjacent odd and even predetermined-length lands and judging the value of one bit assigned to the address unit on the basis of the result of integration. With this operation, it is possible to positively detect the level of the sub data.

For making the above-mentioned "odd–even" subtraction, it is necessary to sample the level of the reading signal RF available at the center of each of the odd and even predetermined-length lands. The detection pulse generation circuit 12 shown in FIG. 9 generates a detection pulse signal Dp as shown in FIG. 10 as a signal for designation of sampling timing for the "odd–even" subtraction.

As will be seen from FIG. 10, as the detection pulse signal Dp for the "odd–even" subtraction, a signal should be generated which takes the H level only at the center of each of the predetermined-length lands as the main data.

For generation of such a detection pulse signal Dp, corresponding timing should be generated based on the content of the main data stored in the sub-data recording section on the disk 100 as in generation of the writing pulse signal Wrp in the aforementioned sub data recorder 50.

Different from the sub data recorder 50, however, the player 1 is not used at the disk maker side. Therefore, the content recorded in the disk 100 cannot be pre-stored in the player 1. On this account, the player 1 is used to read the main data from the sub-data recording section on the loaded disk 100 and store it therein for use to generate the detection pulse signal Dp.

In the player 1, the main data read from the sub-data recording section is stored into a RAM 12*b* provided as a memory in the detection pulse generator 12 shown in FIG. 9. FIG. 11 shows the data structure of the main data. As shown, the main data thus read is stored at each corresponding address.

The detection pulse generation circuit 12*a* in the detection pulse generator 12 generates, based on the content of the main data in the recording section stored in the RAM 12*b*, a data row of which the code in corresponding timing is "1" and other codes are all "0" as in the aforementioned generation of the writing pulse signal Wrp. The detection pulse generation circuit 12*a* generates a detection pulse signal Dp based on the data row thus generated, and supplies it to the A-D converter 11. The A-D converter 11 samples the level of the reading signal RF at a time designated with the detection pulse signal Dp, that is, in correct timing as shown in FIG. 10.

The player 1 reads the sub data as will be described in detail below with reference to the flow diagram shown in FIG. 12.

First in step S201, the disk 100 is loaded into the player 1. Then in step S202, the player 1 stores the main data at each address in the sub-data recording section on the disk 100.

Upon loading the disk 100, the player 1 will start seeking for the top address in the sub-data recording section predetermined between the player 1 and sub data recorder 50 in response to a command from the host computer 6 shown in FIG. 9, for example, to read the main data recorded in the recording section. For the main data thus read, the detection pulse generation circuit 12a shown in FIG. 9 stores the binary data supplied from the binarization circuit 5 at each corresponding address in the RAM 12b on the basis of address information supplied from the address detection circuit 10.

In step S203, the address value N is set to an initial value N0.

In this step S203, an internal counter is initialized to a value N0 for the detection pulse generation circuit 12a to generate a data row indicative of timing of sampling the reading signal RF for each address unit as will be explained below.

In step S204, there is generated a data row in which "1" is inserted at the center of a predetermined-length land as the main data at the address having the value N.

The operation in step S204 is made by the detection pulse generation circuit 12a referring to the content of the main data stored in the RAM 12b. That is, the detection pulse generation circuit 12a generates a data row in which only the code at the center of the predetermined-length land as the main data stored in association with the address N in the RAM 12b is "1" and the codes in other positions are all "0". Since in this embodiment, the marks are to be recorded on the lands of 5T, for example, there should be generated a data row in which only the code at the third bit in the 5T section is "1" and the codes at the other bits are all "0".

With the above operations, there is generated a data row indicative of a sampling point in the address unit at the address N.

After generating the data row including all channel bits in one address unit, the detection pulse generation circuit 12a judges in step S205 whether generation of data rows for all addresses is complete. That is, the detection pulse generation circuit 12a judges whether generation of the data rows is complete for all the address units in the sub-data recording section. The operation in step S205 is effected by the detection pulse generation circuit 12a by judging whether the internal counter once initialized to the value N0 in step S203 has reached a preset predetermined count.

If the result of judgment is negative, namely, if the internal counter has not yet reached the predetermined count, the address value N is incremented by one (in step S206) and then the detection pulse generation circuit 12a returns to step S204. Thus, the detection pulse generation circuit 12a generates the data row for all the address units in the sub-data recording section.

In case the result of judgment in step S207 is affirmative, that is, if the internal counter has reached the predetermined count and generation of data rows for all the addresses is complete, the sub data starts being recorded in step S208.

Upon starting the sub data recording, the detection pulse generation circuit 12a will seek for the top address in the sub-data recording section in the disk 100 in step S209. The seeking in step S209 can be made by the aforementioned controller (not shown) given an instruction on the basis of address information on a sub-data recording section predetermined by the host computer 6 shown in FIG. 8, for example.

In response to seeking for the top address in the sub-data recording section, the detection pulse generation circuit 12a generates a detection pulse signal Dp based on the data row generated for each address unit as in step S204, and supplies it to the A-D converter 11 in step S209. The detection pulse signal Dp based on the data row thus generated is generated based on the timing of the clock CLK for synchronization with the main data to be read.

Also, the detection pulse signal Dp starts being supplied in response to supply of information at the top address in the recording section as address information supplied from the address detection circuit 60.

In next step S210, the value of the sub data is detected by making the "odd−even" subtraction of the values sampled based on the detection pulse signal Dp.

The operation in step S210 is made by the A-D converter 11 and sub data detection circuit 13.

The A-D converter 11 samples the level of the reading signal RF supplied from the matrix circuit 4 at a time designated with the detection pulse signal Dp supplied from the detection pulse generation circuit 12a, and supplies it to the sub data detection circuit 13.

The sub data detection circuit 13 makes the "odd−even" subtraction having been explained above with reference to FIG. 9 by subtracting the even sub data value supplied from the A-D converter 11 from the odd sub data value. The result of the "odd−even" subtraction is integrated for each address unit to detect the sub data value on the basis of the integration value.

Each sub data value is supplied to the ECC circuit 14 in which it will be error-corrected based on an error correction code included in the sub data to reproduce the identification information. The identification information thus reproduced is supplied to the host computer 6 in which it will be used as copyright management information.

The identification information thus supplied to the host computer 6 is used by the latter as will be described in detail later.

4. Optical-Disk Recording Medium, Recorder and Player as Embodiments

As having been described above, the marks can be written and read as the sub data to and from the reflective layer 102 of the disk 100.

As above, the marks are recorded as the sub data on the reflective layer 102 not to influence the reading of main data recorded in the form of a combination of as pits and lands. So, when the main data is only read from the disk 100, the sub data will not be read from the disk 100. Therefore, recording the sub data in the form of marks on the reflective layer 102 is advantageous in that the reading signal in the disk 100 will not be copied to a counterfeit disk.

Note however that the marks are recorded to the reflective layer 102 by irradiation of laser light having a relatively high power. The portion irradiated with the high-power laser light will be heated and thus thermally expanded, and the substrate 101 under the reflective layer 102 will possibly be deformed due to the thermal expansion.

FIG. 1A shows this deformation of the substrate 101. At the portions where the marks 110 are formed, the substrate 101 will thus be concaved (as indicated with a reference numeral 110a) when it is expanded due to the heating, for example.

When the substrate 101 is exposed with the cover layer 103 and reflective layer 102 being separated from the substrate 101 of such as disk 100, concavities 110a will be formed on the surface of the substrate 101 correspondingly to the portions where the marks are recorded as sub data, as shown in FIG. 1B.

At the concavities 110a formed correspondingly to the mark-recorded portions, the reflectance will be reduced a little due to diffraction. That is, if the shape of the substrate 101 has physically been transcribed, the sub data will be reproduced as it is and thus a counterfeit disk is possibly producible based on an authenticated disk. It should be noted that such a counterfeit disk formed by the physical transcription of the substrate can be produced on a large scale by preparing a stamper on the basis of the substrate 101 having been concaved (concavities 110a) at the mark-recorded portions thereof and forming a replica substrate using the stamper.

To prevent the production of a counterfeit disk including a substrate formed by physically transcribing the substrate of an authenticated disk 100, the authenticated disk 100 should be produced by recording sub data so that the latter will be opposite in polarity to sub data in a counterfeit disk including a substrate formed by physically transcribing the substrate of the authenticated disk 100.

Using the difference in sub data polarity between the authenticated and counterfeit disks to judge which an optical disk is, authenticated or counterfeit, it is possible to discriminate between a authenticated disk and a disk produced on the authenticated disk.

can be judged by determining based on the difference in polarity of the sub data value.

To this end, the authenticated disk 100 should be formed to have a property that the reading signal level at the mark-formed portions will be higher than that at the other portions. The Applicant of the present invention succeeded in developing a disk 100 in which the reading signal level will be higher at the mark-formed portions than that at the other portions.

Figure 13:
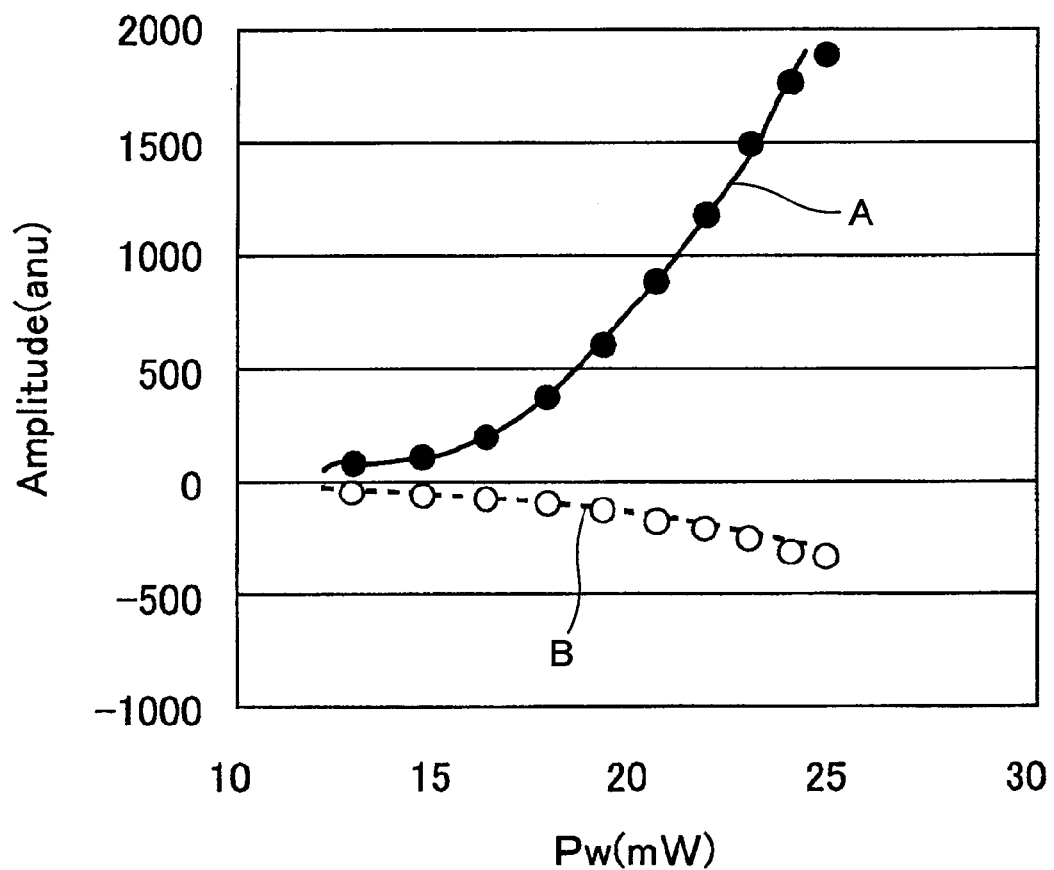
FIG. 13 shows the results of experiments made on the characteristics of the reading signal at mark-formed portions of the optical-disk recording medium as the embodiment of the present invention.

The property is as shown in FIG. 13. In FIG. 13, the "Amplitude" along the vertical axis indicates a value resulted from integration of the result of subtraction of the value of the reading signal RF at the portion where the mark is recorded from that of the reading signal RF at the other portion where no mark is recorded. That is, the larger the integrated value, the large the value of the reading signal RF at the mark-recorded portion is. Also, the "Pw (mW)" along the horizontal axis indicates a laser power used for recording the marks.

In FIG. 13, the solid-line curve indicates the property of an authenticated disk 100 having marks recorded therein by the sub data recorder 50, and the dashed-line curve indicates the property of a counterfeit disk having physically transcribed therein the substrate of the authenticated disk 100.

Note that the results of experiments as shown in FIG. 13 were obtained by recording the marks under the following conditions:

The mark was recorded on a land having a predetermined length 5T on the disk 100. Also, the reflective layer 102 of the disk 100 was formed from an AgSn alloy deposited to a thickness of 40 nm.

To record the marks to the disk 100, the sub data recorder 50 was operated under the following conditions:

| Numerical aperture NA | 0.85 |
|---|---|
| Laser wavelength λ | 405 nm |
| Recording linear velocity | 4.9 m/s |
| Mark recording timing | 30 ns |

Also, the disk 100 (disk D16 having main data recorded therein, which will also referred to as "main data-recorded disk D16" hereunder) was designed in compliance with the Blue-Ray Disk (trademark) standard having previously been described to have a track pitch Tp of 320 nm (1T length=78 nm), pit width of Tp/3 and a pitch depth of λ/5.

Note that the counterfeit disk used in the experiments was prepared by separating the reflective layer 102 from the substrate 101 of the disk 100 having the marks recorded therein under the above conditions to extract only the substrate 101, physically transcribing the shape of the substrate 101 to form a stamper, forming a substrate 101 by molding with the stamper, and depositing a reflective layer 102 on the substrate 101 thus formed.

First, it will be seen that in the authenticated disk 100 whose property is indicated with a solid-line curve A in FIG. 13, when the laser power is within a range of 12 to 25 mW, the "Amplitude" along the vertical axis is higher than the level "0". That is, it will be understandable that, which means that the reading signal level at the portions where the marks are recorded is higher in level.

On the contrary, with the same change of the laser power, the "Amplitude" is lower than the level "0" in the counterfeit disk whose property is indicated with the dashed-line curve B, which means that the reading signal level at the portions where the marks are recorded is lower.

As will be known from the above, the marks can be recorded to the optical disk as the embodiment of the present invention so that the reading signal RF at the mark-recorded portions in the disk will be different in polarity from that in the counterfeit disk having transcribed thereto the shape of the substrate 102 of the authenticated disk 100. That is to say, the reading signals RF where the marks are formed will be different in polarity between an authenticated disk 100 and a counterfeit disk produced based on the disk 100.

Note that the results of experiment proved that when the mark was recorded at a portion corresponding to a pit, the higher the laser power, the lower the reading signal level was only found. That is to say, when the mark is recorded at the portion corresponding to the pit, the polarity of the reading signal in the authenticated disk 100 will not be opposite to that in a counterfeit disk produced based on the authenticated disk.

FIG. 14 schematically illustrates, for reference, the result of observation, by an AFM (atom force microscope), of the shape the substrate 101 took when the marks are recorded to the disk 100 by the sub data recorder 50 shown in FIG. 9 under the same operating conditions as for the results of experiments shown in FIG. 13.

Figure 14A:
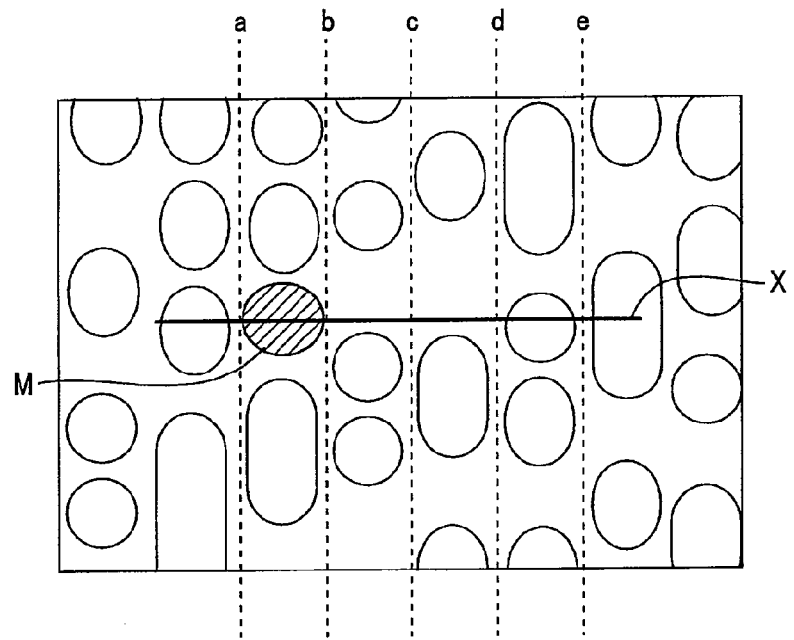
FIG. 14A schematically illustrates the results of observation of the substrate shape of a mark-recorded optical-disk recording medium.
Figure 14B:
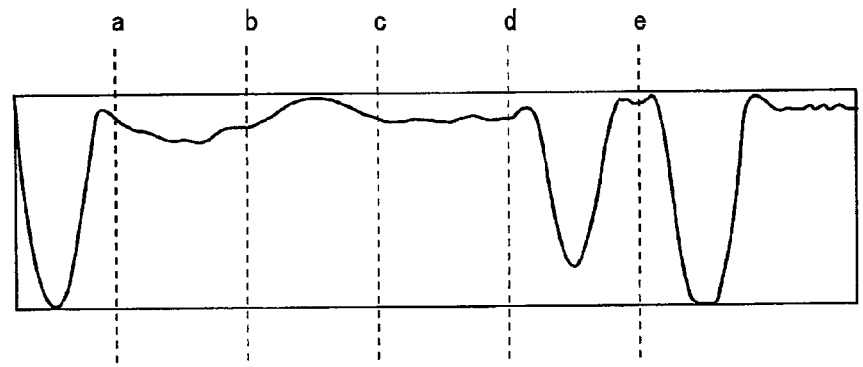
FIG. 14B is a sectional view taken along the line X in FIG. 14A.

FIG. 14A shows the result of observation of the upper surface of the substrate 101, and FIG. 14B shows the result of observation of the section, taken along the solid line X in FIG. 14A, of the substrate 101. The dashed lines a to e in FIG. 14B indicate the positions of the dashed lines a to e, respectively, in FIG. 14A.

As will be seen from FIGS. 14A and 14B, the depth of the mark-recorded portion M is larger than the depth (c to d, for example) of the authenticated land portion, which will make it clear that the concavity in the substrate 101 is deformed due to the mark recording. Also, the mark width at the mark-recorded portion M may be regarded as a width of a portion whose depth is larger than that of the authenticated land portion as shown in FIG. 14B. In this case, however, it is seen that the mark width is a little larger than that of one track defined between two adjacent ones of the dashed lines a and b as shown.

Here will be explained with reference to FIGS. 15 to 21 the principle on which the reading signal level will be raised at the mark-recorded portions on the disk 100 as the embodiment of the present invention but will be lowered at such mark-recorded portions on a counterfeit disk having physically transcribed thereto the substrate shape of the disk 100, as will be known from the results of experiment shown in FIG. 13.

Figure 15A:
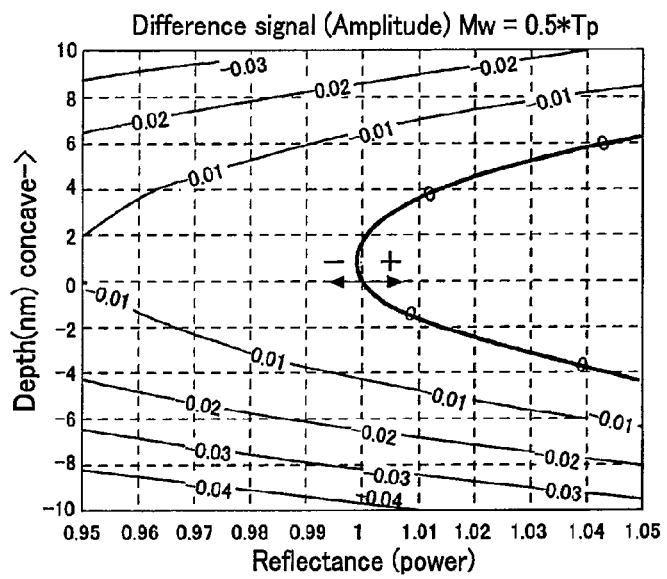
FIGS. 15A, 15B and 15C graphically illustrate the results of calculation, by simulation, of the characteristics (depth to mark and mark reflectance) of the reading signal level where the marks are recorded on predetermined-length lands on the optical-disk recording medium to which main data is recorded in the form of a combination of pits and lands.
Figure 15B:
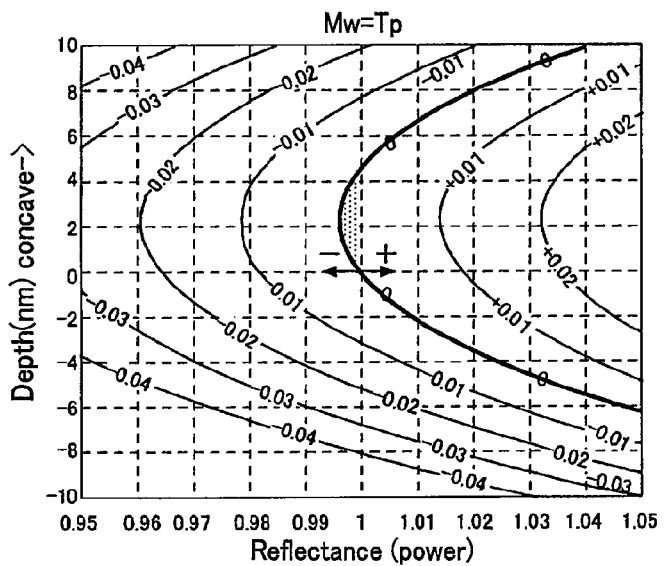
Figure 15C:
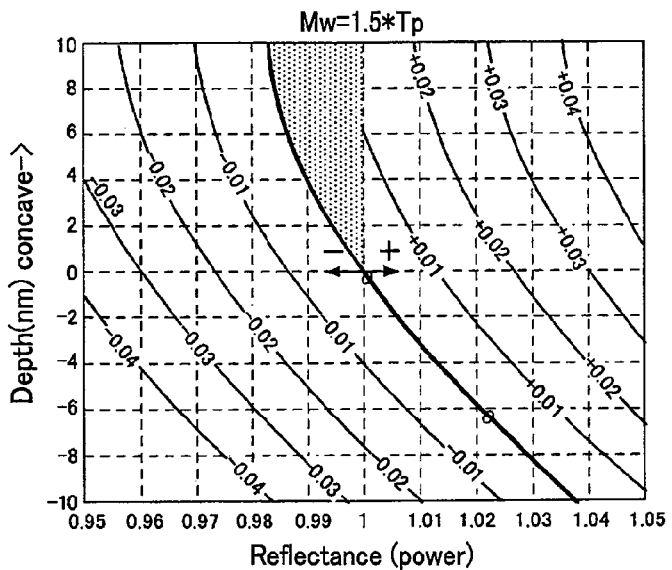

FIGS. 15A to 15C show the results of calculation, by simulation, of the characteristic of the reading signal level at the mark-recorded portions when the marks are recorded on predetermined-length lands of a disk to which main data is recorded in the form of a combination of pits and lands.

FIGS. 15A to 15C show, with the mark depth being indicated along the vertical axis and reflectance of the laser light being indicated along the horizontal axis, the change in characteristic of a signal of a difference (same as the "Amplitude" shown in FIG. 13) resulted from subtraction of the value of the reading signal RF at the portion where no mark is recorded from that of the reading signal RF at the mark-recorded portion.

Figure 16:
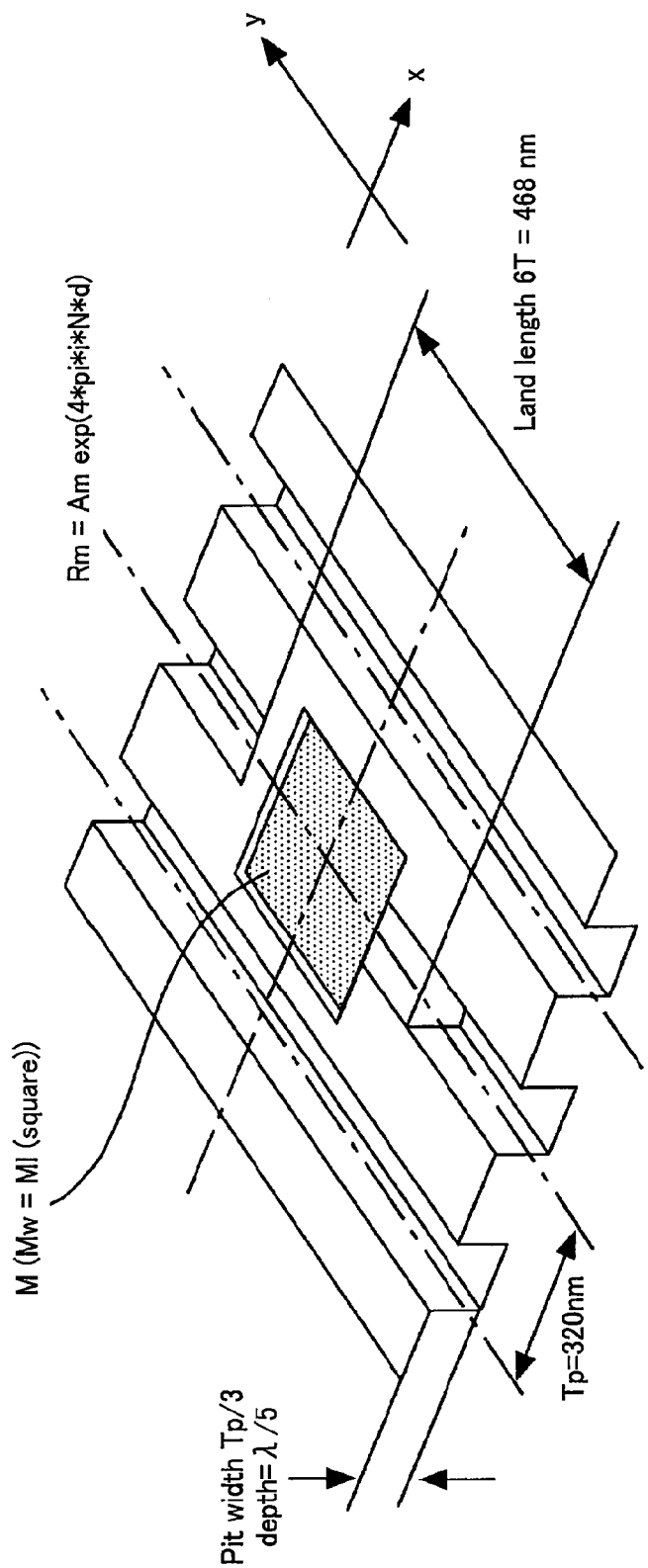
FIG. 16 explains the optical conditions set for obtaining the results of calculation shown in FIGS. 15A to 15C.

The optical conditions set for obtaining the results of calculation shown in FIGS. 15A to 15C will be explained below with reference to FIG. 16. The track pitch Tp was 320 nm, pit width was Tp/3 (320/3 nm), and the pith depth was $\lambda/5$. The mark M was in the shape of a square in which the mark width Mw is equal to mark length Ml and it was formed on a land portion having a length of 6T, as shown in FIG. 16. In this case, the length of 1T is 78 nm, and that of 6T is 468 nm. Also, the laser wavelength $\lambda$ used in this case is 405 nm and numerical aperture NA of the objective lens to focus the laser light on the land is 0.85, which however are not illustrated.

Also, the mark amplitude reflectance Rm was Am exp(4×pi×i×N×d) and Rm-intensity was 100%. Further, the unit cell in calculation was 22T×3 tracks.

Note that as will be seen from comparison with the optical conditions having been described above with reference to FIG. 13, the laser wavelength $\lambda$ of the laser light used in this case, numerical aperture NA of the objective lens, pitch Tp of the track formed on the disk, pit width and pit depth were set to be equivalent to those for the disk 100 (D16) as the embodiment of the present invention.

FIGS. 15A, 15B and 15C show the characteristics of the difference signal when the mark width Mw was set 0.5Tp, 1.0Tp and 1.5Tp, respectively, under the above optical conditions. In this case, since the mark width Mw is equal to the mark length Ml as in the example shown in FIG. 16, FIGS. 15A, 15B and 15C show the characteristics of the difference signal when the size of the mark M was changed.

As will be seen from FIGS. 15A to 15C, when no marks M are formed, the mark depth will be "0" and mark reflectance be "1". The value of the difference signal resulted from the subtraction of the value of the reading signal RF at the portion where no marks M are recorded from that of the reading signal RF at the mark-recorded portions will be "0" at the intersection between the mark depth "0" and mark reflectance "1" when no marks M are formed, as will be known from FIGS. 15A, 15B and 15C.

Note here that the reading signal level will possibly be raised due to an increased reflectance at the mark-recorded portion or will possibly be raised without any increase of the mark reflectance.

The Applicant of the present invention discloses in the International Publication No. WO01/008145 that the results of experiments made on the mark recording on reflective layers 102 formed from different materials proved that the reflectance is increased at the mark-recorded portion in some cases and not increased at the mark-recorded portion in other cases.

For example, the Applicant of the present invention referred, in the above International Publication, to $Ag_{95.5}Cr_{4.5}$ and the like (the subscripts indicate the ratios of the elements) as a material for a reflective layer 102 of which the reflectance is increased at the mark-recorded portions and to $Ag_{95.0}Si_{5.0}$ and the like as a material for a reflective layer 102 of which the reflectance is not increased at the mark-recorded portions.

Here will first be considered the case in which the reading signal level is raised at the mark-recorded portion without increase of the reflectance.

Explanation will be made with attention given to FIGS. 15A to 15C on the assumption that the reflectance is not increased at the mark-recorded portion. The reading signal level is raised without increase of the mark reflectance at a portion whose depth ranges from "0" to a certain depth and which is shown hatched in each of FIGS. 15A, 15B and 15C.

In this case, however, when the mark width Mw is 0.5Tp, there is little portion where the reading signal level is raised without increase of the mark reflectance, as will be seen from FIG. 15A. On the other hand, as the mark width Mw is increased from 0.5Tp to 1.0Tp and then to 1.5Tp, such a portion where the reading signal level is raised without increase of the mark reflectance is expanded, as will also be seen from FIGS. 15B and 15C.

With the above characteristic, when the mark width (mark size) Mw is too small, there will be obtained no portion where the reading signal level is raised without increase of the mark reflectance. Thus, there is a possibility that the reading signal level cannot be raised at the mark-recorded portion.

Therefore, it will be seen that the mark size is an important factor for raising the reading signal level at the mark-recorded portion.

Also, as will be seen from FIG. 15B, when the mark depth exceeds a certain range, the reading signal level will become negative and be lowered at the mark-recorded portion. It will be seen that the mark depth is also an important factor for raising the reading signal level at the mark-recorded portion.

Figure 17A:
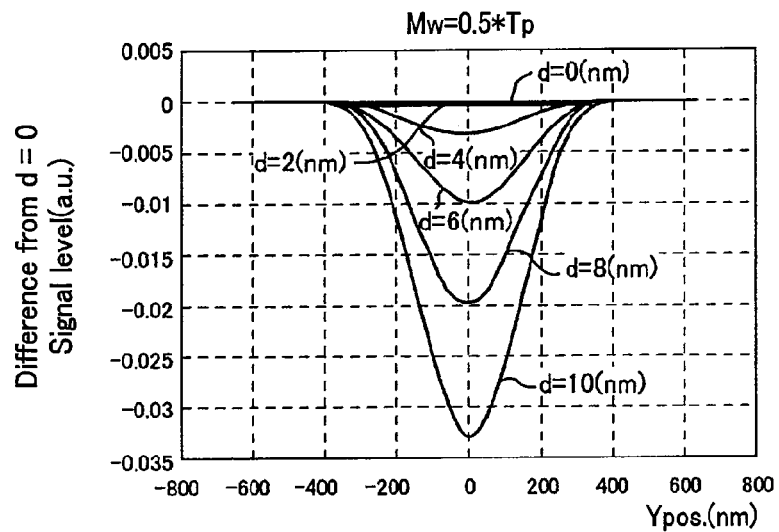
FIGS. 17A, 17B and 17C graphically illustrate the results of calculation, by simulation, of the characteristics of the reading signal level where the marks are formed when the mark size and depth are changed.
Figure 17B:
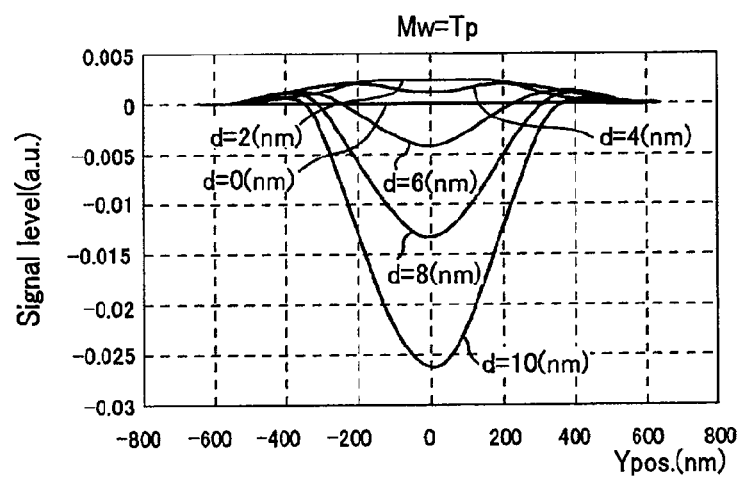
Figure 17C:
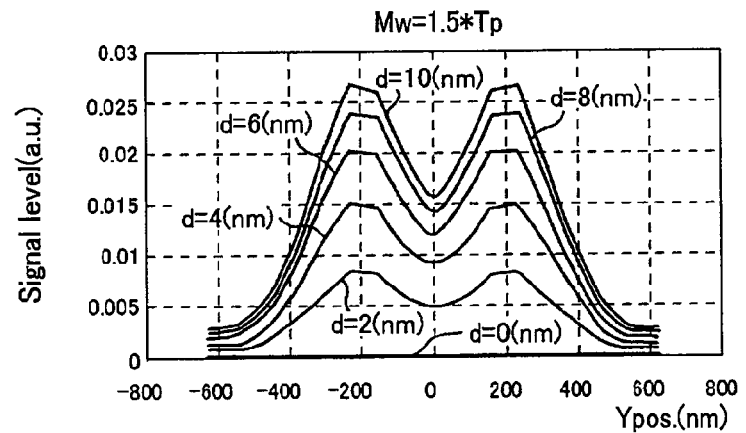

FIGS. 17A to 17C show, as other results of simulation, the characteristic of the difference signal when the mark depth is varied under the same optical conditions as having been explained above with reference to FIG. 16, at each of the mark widths Mw of 0.5Tp, 1.0Tp and 1.5Tp, respectively, as in FIGS. 15A to 15C. Note that the difference signal shown in FIGS. 17A to 17C indicates a difference from the reading signal level when the mark depth d is 0, that is, a reading signal level itself attained at each of the mark depths.

The above results of simulation show that with the mark width Mw being 0.5Tp as shown in FIG. 17A, the difference signal level is a little higher than the "0" level, namely, the reading signal level is raised, when the mark depth is 2 nm. It will be seen that as the mark depth is increased, the difference signal becomes negative and the reading signal level is lower.

Also, with the mark width Mw is Tp, the difference signal has a level higher than the "0" level when the mark depth is increased to 2 nm and to 4 nm as shown in FIG. 17B. With the mark depth being further increased, the reading signal level will be lower.

Also it will be seen that with the mark width Mw is 1.5Tp, the difference signal level is raised as the mark depth is increased, namely, the larger the mark depth, the higher the reading signal level becomes as shown in FIG. 17C.

Therefore, the results of simulation reveals that the mark width Mw (mark size) and mark depth are determining factors upon which it depends whether the reading signal level is raised at the mark-recorded portion.

Note that although these figures show the results of simulation with only the mark depth being changed while the mark width Mw is kept fixed, increase of the laser power in use for increasing the mark depth will result in a correspondingly increased mark width Mw.

Therefore, in an actual recording, both the mark depth and mark width Mw will be increased correspondingly to increase of the laser power.

In view of the above, it can be considered that as the mark depth is actually increased, the characteristic shown in FIGS. 15A to 15C varies as in FIGS. 15A, 15B and 15C in this order.

As will be seen from the aforementioned results of simulation, the reading signal level can be raised by setting a mark depth and width on the assumption that the reflectance will not be increased at the mark-recorded portion. However, on the assumption that the reading signal level at the mark-recorded portions are raised depending upon the mark depth and width, these conditions will be satisfied also in a counterfeit disk produced by physical transcription of an authenticated disk if the concavities in the substrate 101 of the authenticated disk are reproduced in the counterfeit disk. As a result, the reading signal level will possibly be raised at the mark-recorded portions in the counterfeit disk as well.

In the disk 100 as the embodiment of the present invention, however, it has been made sure that the reading signal level is lowered at the mark-recorded portion in a counterfeit disk produced by physical transcription of an authenticated disk as having been described above with reference to FIG. 13.

In the counterfeit disk produced based on an authenticated, the reading signal level is lowered at the mark-recorded portions on a principle which will be described below:

The above description has been made with reference to FIGS. 15A to 15C and 17A to 17C on the assumption that recesses are formed as marks M in the substrate 101 itself. Actually, however, the reflective layer 102 is stacked on the substrate 101.

Figure 18A:
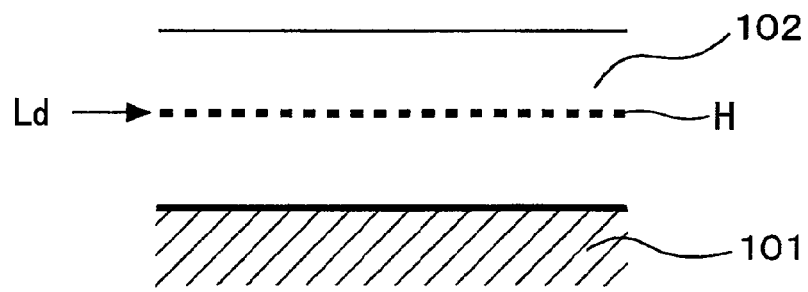
FIGS. 18A, 18B and 18C are sectional views of the optical-disk recording medium for explaining that the optical depth of mark-formed portions is different between an authenticated disk and a counterfeit disk produced based on the authenticated disk.

It is well known that actually, the reading optical system will detect a return part, of the laser light having the writing power irradiated to the reflective layer 102, from a reflecting surface H that is not the surface of the reflective layer 102 but is between the substrate 101 and reflective layer 102 as indicated with a dashed line in FIG. 18A, for example. The reflecting surface from which return light is detected by the reading optical system is referred to as an "optical reflecting surface" and the depth of the reflecting surface is referred to as "optical depth Ld" herein.

Figure 18B:
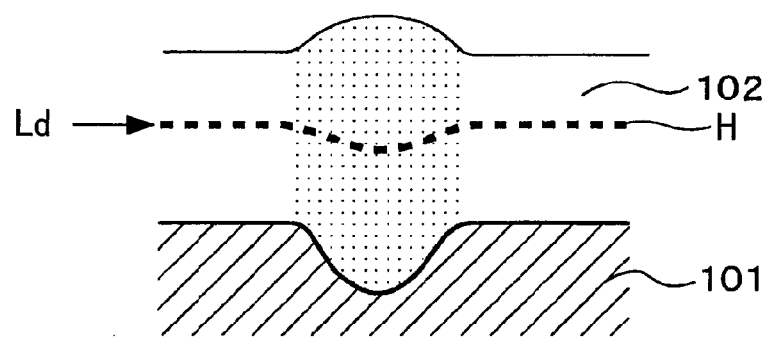

When the marks are recorded, the optical depth Ld in the authenticated disk 100 is as shown in FIG. 18B. That is, in the authenticated disk, the optical depth Ld will not be any optical depth precisely corresponding to the depth of the concavity formed in the substrate 101, but will be less than the optical depth corresponding to the concavity depth, because of a variation of the optical constant of the reflective layer 102 due to oxidation caused by the mark recording.

Figure 18C:
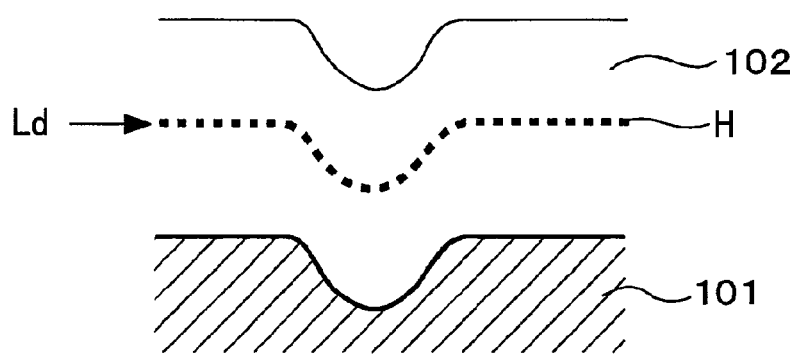

On the contrary, a counterfeit disk will be produced by separating the reflective layer 102 having the varied optical constant from the substrate 101 of the authenticated disk, and then depositing a reflective layer 102 on a substrate 101 (replica substrate) formed by physical transcription of the shape of the substrate 101 of the authenticated disk 100. Thus, since the optical depth Ld in the physically transcribed substrate 101 will precisely correspond to the concavity depth in the original substrate 101 as shown in FIG. 18C, so the optical depth Ld in the counterfeit disk will be larger than the optical depth Ld in the authenticated disk.

Thus, the optical depth Ld in the counterfeit disk is larger than that in the authenticated disk so that the polarity of the reading signal level in the authenticated disk will be opposite to that in the counterfeit disk.

The above will be explained below with reference to FIG. 19. It should be noted that FIG. 19 show the similar difference-signal characteristic to those in FIG. 15B (when the mark width Mw is Tp).

Figure 19:
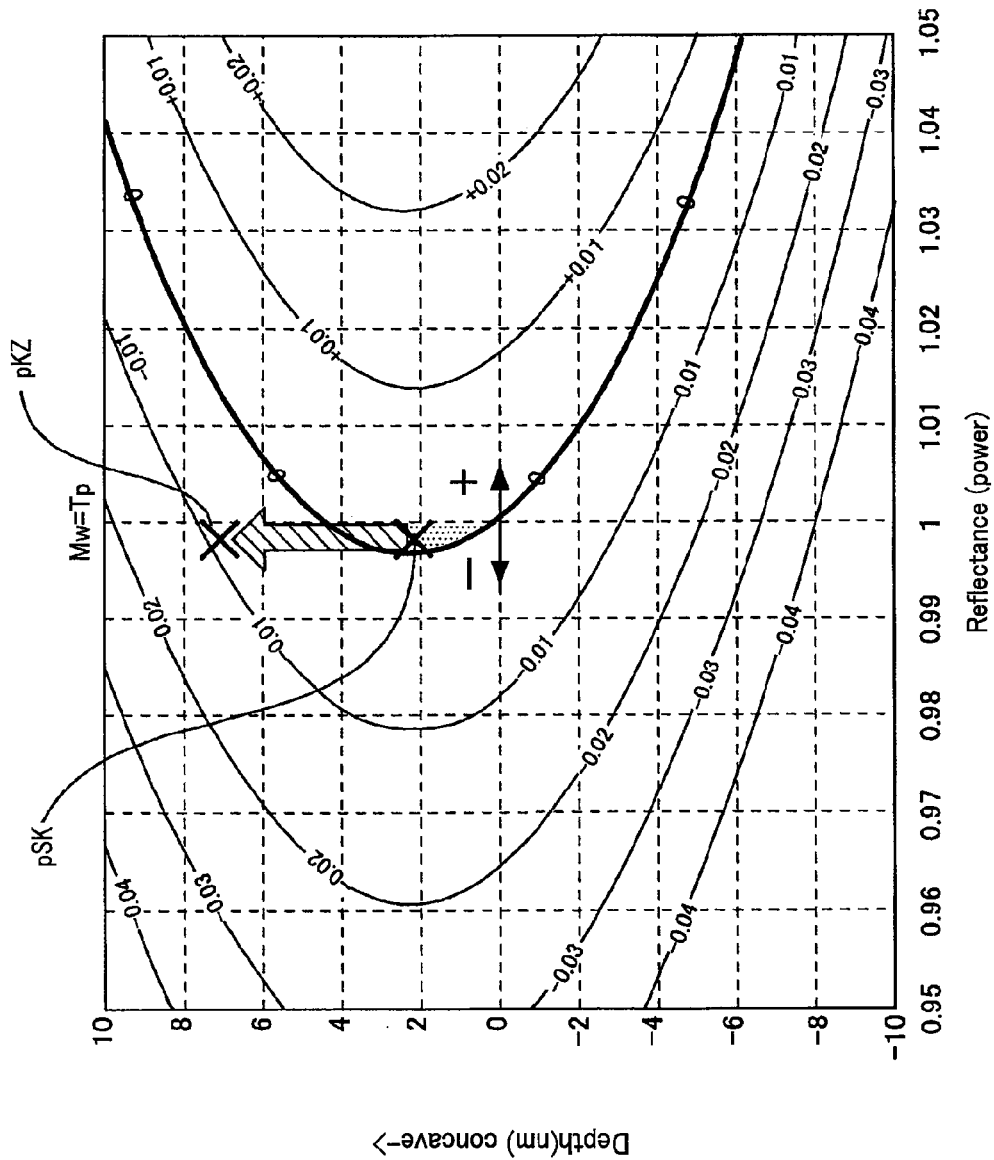
FIG. 19 graphically illustrates the results of calculation of the characteristics (depth to mark and mark reflectance) of the reading signal level where the marks are recorded as in FIGS. 15A to 15C for explaining that on the assumption that the reading signal level rises without increase of the mark reflectance, the polarity of the reading signal at the mark-formed portions is different between an authenticated disk and a counterfeit disk produced based on the authenticated disk.

When the depth of the mark recorded to an authenticated disk is pSK as in FIG. 19, the mark depth in the counterfeit disk is possibly pKZ, for example, as shown if the optical depth Ld in the counterfeit disk is larger than that in the authenticated disk.

That is, with the optical depth Ld being thus larger in the counterfeit disk, the value of the difference signal, which is positive, in the authenticated disk will go over the "0" as indicated with an arrow in FIG. 19 to a negative value, so that the polarity of the reading signal in the polarity in the counterfeit disk can be made opposite to that in the authenticated disk.

As will be seen from the above description of the principle on which the reading signal level is lowered at the mark-recorded portion, even if the optical depth is larger in the counterfeit disk, the reading signal level will not possibly become negative in case the mark recorded to the disk 100 is not sufficiently deep.

For example, if the mark recorded in the disk 100 is at a depth rather smaller than the position pSK as shown in FIG. 19, there is a possibility that the position pKZ will not be outside a "0" line of the difference signal, so that the reading signal level will be positive as in the authenticated disk.

Thus, the mark depth can thus be a determining factor upon which it depends whether the reading signal level will be lowered in a counterfeit disk.

It will be seen from the above description that the size and depth of the mark recorded to the disk 100 (authenticated disk) are determining factors upon which it depends whether the reading signal level is raised at the mark-recorded portion of the authenticated disk 100 having the mark actually recorded thereto and the reading signal level is lowered at the mark-recorded portion of a counterfeit disk produced based on the authenticated disk 100.

Thus, by recording or forming marks on the disk 100 (main data-recorded disk D16) to such a size and depth that the reading signal level will be raised at the mark-recorded portions of the authenticated disk 100 but will be lowered at the mark-recorded portions of a counterfeit disk, the polarity of the reading signal RF at the mark-recorded portions in the authenticated disk 100 can be made opposite to that in the counterfeit disk produced based on the authenticated disk 100.

The optical conditions to which the disk 100 and sub data recorder 50 are set meet the ones under which such a mark size and depth can be assured that the reading signal level will be raised at the mark-recorded portions in the disk 100 but will be lowered at the mark-recorded portions in the counterfeit disk produced based on the disk 100.

Figure 12:
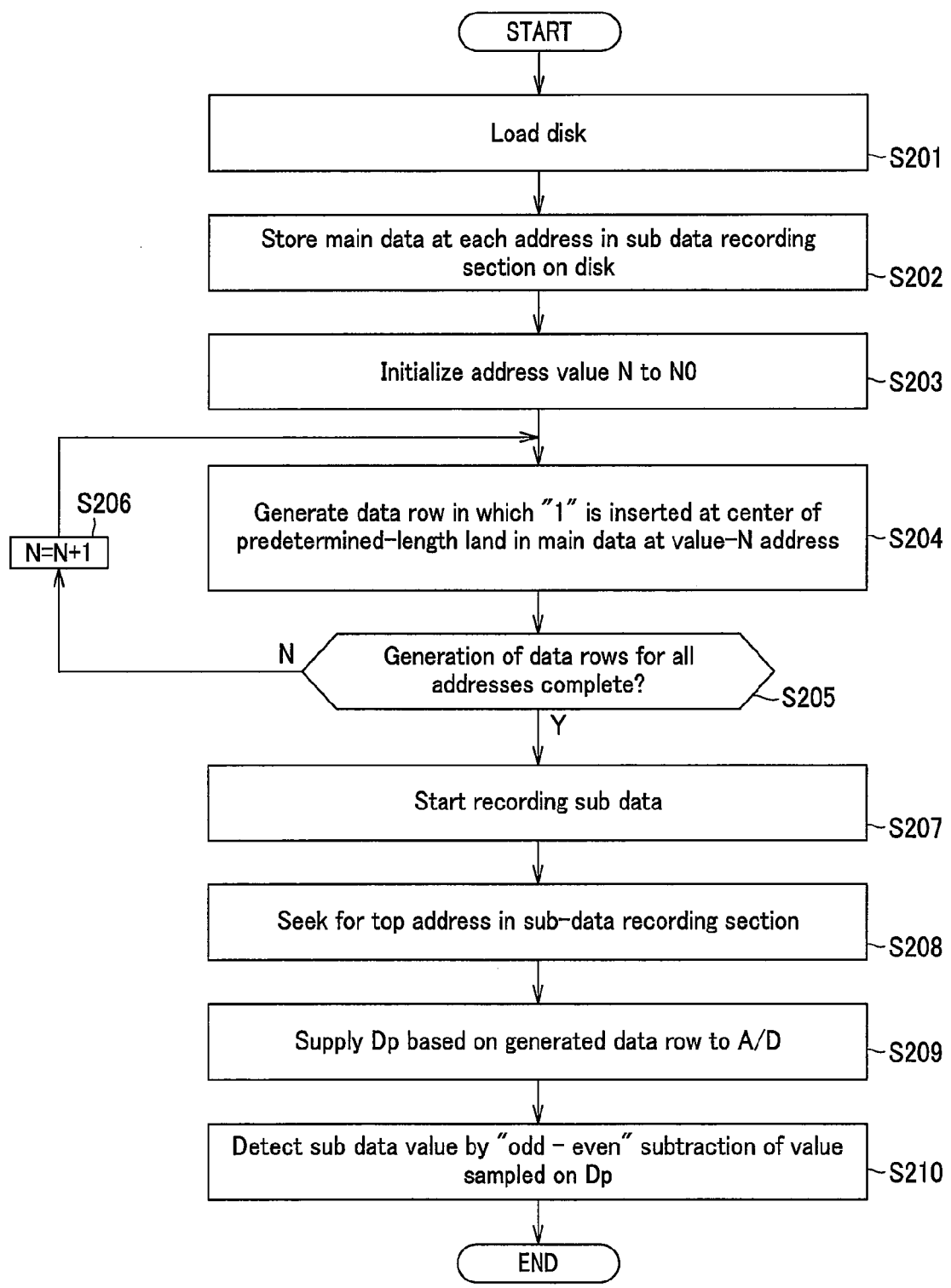
FIG. 12 shows a flow of operations made in reading sub data by the player as the embodiment of the present invention.

Thus, the polarity of the reading signal level at the mark-recorded portions in the authenticated disk 100 can be made opposite to that in the counterfeit disk produced based on the disk 100 as will be seen from the results of experiment shown in FIG. 12. Therefore, it is possible to judge between an authenticated disk and a counterfeit disk on the basis of the difference in polarity of the reading signal RF between the authenticated and counterfeit disks.

In the foregoing, the present invention has been explained on the assumption that the reading signal level is raised at the mark-recorded portion without increase of the reflectance. However, it is possible as having also been described above that the reflectance is increased at the mark-recorded portion with rise of the reading signal level.

Also in case the mark reflectance is increased at the mark-recorded portions with rise of the reading signal level, the polarity of the reading signal RF at the mark-recorded portions in the authenticated disk 100 can be made opposite to that in the counterfeit disk by recording (or forming), to the authenticated disk, marks having such a size and depth that the reading signal level will be raised at the mark-recorded portions in the authenticated disk but will be lowered at the mark-recorded portions in the counterfeit disk, as having been mentioned above.

Figure 20:
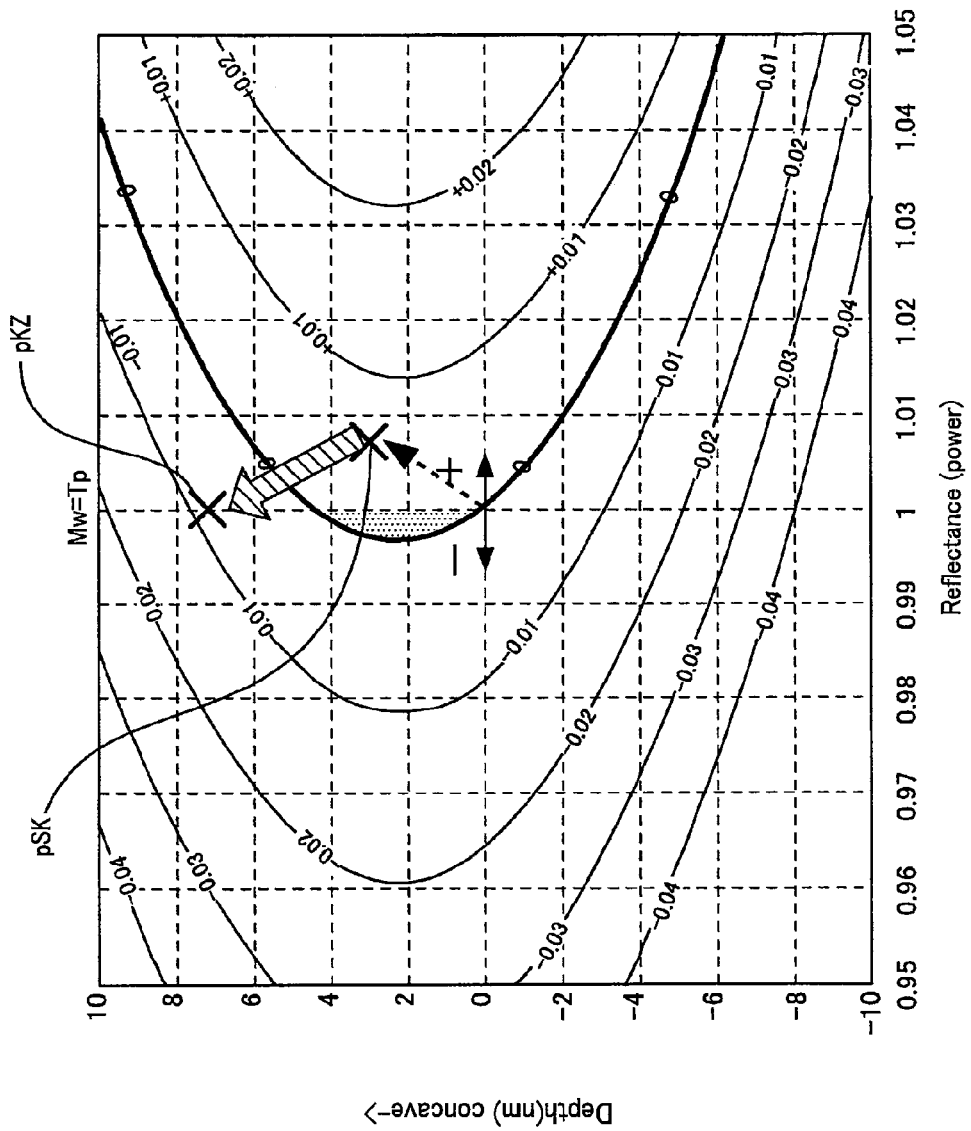
FIG. 20 graphically illustrates the results of calculation of the characteristics (mark depth and mark reflectance) of the reading signal level where the marks are recorded as in FIG. 19 for explaining that on the assumption that the mark reflectance increases with rise of the reading signal level, the polarity of the reading signal at the mark-formed portions is different between an authenticated disk and a counterfeit disk produced based on the authenticated disk.

FIG. 20 shows the results of simulation (with the mark width Mw being Tp) of the difference-signal characteristic as in FIG. 19. In case the mark reflectance is increased with rise in level of the reading signal RF as above, the depth and reflectance of the mark recorded on the authenticated disk will take values as indicated with pSK, for example, in FIG. 20. That is, the position pSK indicates a position in which the mark is given a certain degree of depth by deformation of the substrate 101 due to the mark recording and the level of the reading signal RF is raised due to increase of the reflectance at the mark-recorded portion.

Here will be explained a counterfeit disk produced based on an authenticated disk 100 having recorded thereto marks of such a depth and reflectance as can be identified with the position pSK. Since the optical depth Ld in the counterfeit disk precisely corresponds to the shape of the concavity in the substrate 101 as having been described above with reference to FIGS. 18A to 18C, so it will be larger than the optical disk Ld in the authenticated disk 100.

Also, since a new reflective layer 102 is deposited on the substrate 101 in the counterfeit disk, the reflectance at the mark-recorded portion will return to "1".

Thus, the mark depth and reflectance in the counterfeit disk produced based on an authenticated disk can possibly have values indicated with pKZ in FIG. 20, for example. That is, as the position pSK is shifted to pKz, the value of the difference signal goes over the "0" level and becomes negative so that the polarity of the reading signal RF in the authenticated disk will be opposite to that in the counterfeit disk.

As will be seen from the illustration of the disk state changed from a disk with no marks to a counterfeit disk through a disk having the marks recorded thereto as in FIG. 20 and also from the illustrated changes in the difference-signal characteristic corresponding to the mark sizes shown in FIGS. 15A, 15B and 15C, respectively, there is a possibility that the difference signal will not go over the "0" level and become negative depending upon the depth and size of the mark formed on the authenticated disk even if the optical depth Ld is larger and the reflectance at the mark-recorded position becomes "1" in the counterfeit disk.

That is to say, it will also be seen that the depth and size of the mark formed on the authenticated disk are determining factors upon which it depends whether the polarity of the reading signal RF in the authenticated disk is opposite to that in the counterfeit disk.

Thus, also in case the marks can be recorded to an authenticated disk so that the mark reflectance will be increased at the mark-recorded portions with rise of the reading signal level, the polarity of the reading signal RF at the mark-recorded portions in the authenticated disk 100 can be made opposite to that in the counterfeit disk by recording (or forming), to the authenticated disk 100 (main data-recorded disk D16), marks to such a size and depth that the reading signal level is raised at the mark-recorded portions in the authenticated disk 100 but will be lowered at the mark-recorded portions in a counterfeit disk, as in case the reading signal level is raised at the mark-recorded portions without increase of the reflectance.

It should be reminded that under the optical conditions for the disk 100 as the embodiment of the present invention and sub data recorder 50 are set as above, the experiments resulted in that the reading signal level will be raised at the mark-recorded portions in the disk 100 while the polarity of the reading signal at the mark-recorded portions in the disk 100 will be opposite to that in a counterfeit disk. Therefore, even on the assumption that the mark reflectance is increased at the mark-recorded portion with rise of the reading signal level, such a mark size and depth can be assured under the optical conditions set according to the present invention that the reading signal level will be raised at the mark-recorded portions in the disk 100 but will be lowered at the mark-recorded portions in the counterfeit disk.

In the foregoing, it has been described that on the assumption that the reflectance is increased with rise of the reading signal level, the optical depth in the counterfeit disk is larger than in the authenticated disk so that the polarity of the reading signal RF at the mark-recorded portion in the authenticated disk is opposite to that in the counterfeit disk. However, it is possible that the optical depth in the authenticated disk will be equal to that in the counterfeit disk. Even in this case, it is also possible that the polarity of the reading signal RF in the authenticated disk will be opposite to that in the counterfeit disk.

Even in case the optical depth Ld in the authenticated disk is equal to that in a counterfeit disk produced based on the authenticated disk, the polarity of the reading signal RF in the authenticated disk will be opposite to that in the counterfeit disk as the case may be as will be described below with reference to FIG. 21.

Figure 21:
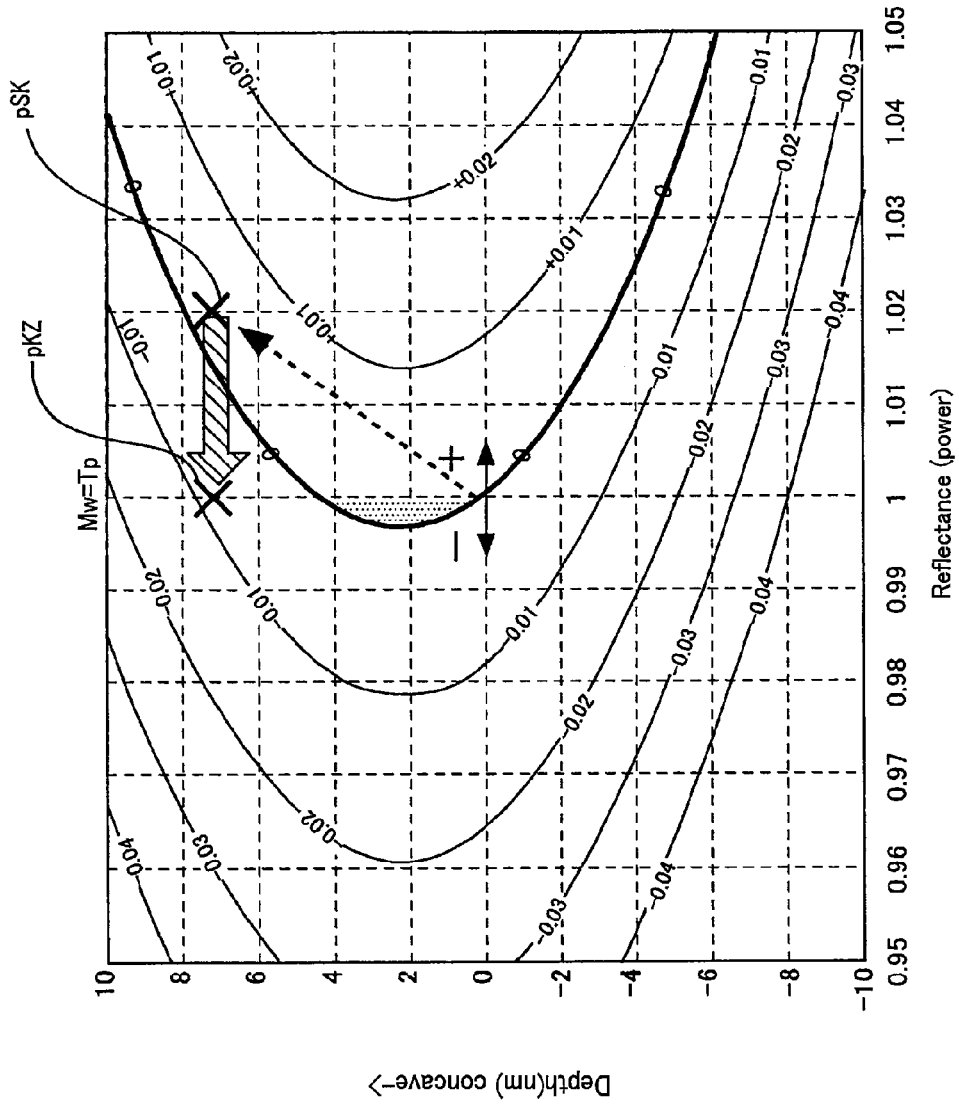
FIG. 21 graphically illustrates the results of calculation of the characteristics (mark depth and mark reflectance) of the reading signal level where the marks are recorded as in FIG. 19 for explaining that on the assumption that the mark reflectance increases with rise of the reading signal level and the optical depth of the mark-formed portions is different between an authenticated disk and counterfeit disk produced based on the authenticated disk, the polarity of the reading signal at the mark-formed portions is different between the authenticated disk and counterfeit disk.

Note that FIG. 21 shows the results of simulation of the difference-signal characteristic when the mark width Mw is Tp as having been described above with reference to FIGS. 19 and 20.

Also in this case, the mark recording will cause the mark depth and reflectance to be increased to some extent, and the depth and reflectance of the marks formed on the authenticated disk will have values indicated with pSK in FIG. 21. Since it is premised in this case that the optical depth Ld in the authenticated disk is equal to that in the counterfeit disk, so there arises no difference in mark depth between the authenticated and counterfeit disks and thus the mark reflectance will only change to "1". That is to say, as shown in FIG. 21, the mark depth and reflectance in the authenticated disk are indicated with pSK, while in the counterfeit disk, only the mark reflectance is changed to "1" so that the mark depth and reflectance will come to a point indicated with pKZ and the difference signal go over the line of "0" and become negative.

As will be seen from the illustration of the disk state changed from a disk with no marks to a counterfeit disk through a disk with the marks recorded as in FIG. 21 and also from the illustration of the changes in the difference-signal characteristic corresponding to the mark sizes shown in FIGS. 15A, 15B and 15C, respectively, there is a possibility that if the depth and size of the marks formed in the authenticated disk are not correct, the polarity of the reading signal RF in the counterfeit disk will not go negative even if the mark reflectance in the counterfeit disk changes to "1". As shown in FIG. 21, the polarity of the reading signal will remain positive and not be inverted in case the mark depth is less than about 4 nm, for example.

Thus, it will be seen that in case the mark reflectance increases and the reading signal level is raised, the depth and size of the marks formed in the authenticated disk are determining factors upon which it depends whether the polarity of the reading signal in the authenticated disk will be opposite to that in the counterfeit disk even on the assumption the optical depth Ld in the authenticated disk will remain unchanged in the counterfeit disk.

In other words, when the marks are formed in the disk 100 (main data-recorded disk D16) to such a size and depth that the reading signal level will be raised at the mark-recorded portions in the authenticated disk but will be lowered at the mark-recorded portions in the counterfeit disk, the polarity of the reading signal RF at the mark-recorded portion in the authenticated disk 100 can also be made opposite to that in the counterfeit disk.

Note that the conditions to which the sub data recorder 50 is set, such as the numerical aperture NA of 0.85, laser wavelength λ of 405 nm, recording linear velocity of 4.9 m/s, mark recording pulse of 30 ns and laser power of 12 to 25 mW, are just examples. As will be seen from the above explanation, a disk 100 whose reading signal will be inverted in polarity in a counterfeit disk produced based on the disk 100 can be produced by forming marks in the disk 100 to such a size and depth that the reading signal level will be raised at the mark-recorded portions in the authenticated disk but will be lowered at the mark-recorded portions in the counterfeit disk.

Also, the conditions under which the disk 100 (main data-recorded disk D16) is designed are not limited to the aforementioned ones (track pitch Tp of 320 nm, pit width of Tp/3, pit depth of λ/5 and 1T length of 78 nm) but may be any other appropriate ones.

Also, the marks may be recorded on lands having a length other than 5T (6T).

However, if the design conditions for the disk 100 (D16) are other than the aforementioned ones and the lands on which the marks are to be formed have a length other than the aforementioned one, the relation between the size and depth of the recorded marks will vary with the result that the same difference-signal characteristic as shown in FIGS. 15A to 15C will not be assured.

However, in case marks are recorded to a disk to which main data is recorded as in the form of a combination of pits and lands and also to another disk to which main data is recorded as the same pits and lands as in the former disk, a difference-signal characteristic different from, but similar to, that shown in FIGS. 15A to 15C can be assured (on the assumption that the reading signal level is raised without increase of the mark reflectance, the difference-signal characteristic as shown hatched in FIGS. 15A to 15C and resulting in a point where the reading signal level is raised without increase of the mark reflectance can be assured in both the disks). In this case, the sub data recorder 50 can be set to conditions under which marks are to be formed on the disk to such a size and depth that the reading signal level will be raised at the mark-recorded portions in the authenticated disk but will be lowered at the mark-recorded portions in a counterfeit disk produced based on the authenticated disk, depending upon the difference-signal characteristic different from that in FIGS. 15A to 15C, whereby it is made possible to produce a disk 100 of which the reading signal polarity will be inverted in a counterfeit disk produced based on the disk 100.

Also, for producing the disk 100 shown in FIG. 3, the operation in step S17 in which the sub data is recorded is effected with the sub data recorder 50 set to conditions under which marks are to be formed on the disk to such a size and depth that the reading signal level will be raised at the mark-recorded portions in the authenticated disk but will be lowered at the mark-recorded portions in a counterfeit disk produced based on the authenticated disk, as above, whereby it is made possible to produce a disk 100 of which the reading signal polarity will be inverted in a counterfeit disk produced based on the disk 100.

For confirmation of the above, there will be explained with reference to FIG. 22 the waveform of the reading signal in the disk 100 produced as the embodiment of the present invention and in which the reading signal level will be raised at the mark-recorded portions as above. It should be noted that in FIG. 22, there are shown an example of mark recording in which "0" is assigned as the value of one bit of the sub data to one address unit in the disk 100 and an example of mark recording in which "1" is assigned as the value of one bit of the sub data to one address unit, as shown in FIG. 10.

Figure 22:
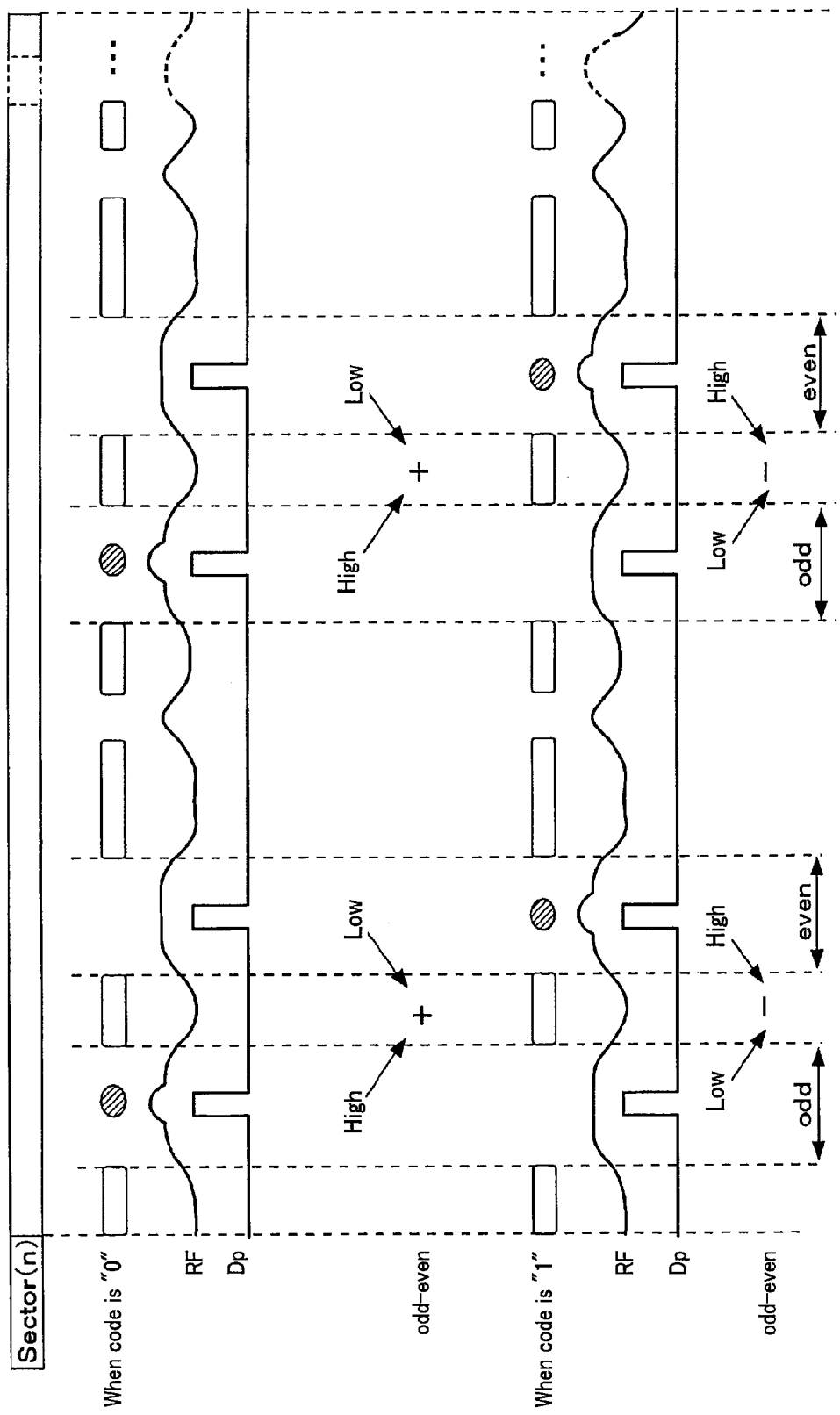
FIG. 22 explains the waveform of a reading signal obtained in the optical-disk recording medium as the embodiment of the present invention.

As will be seen from FIG. 22, the level of the reading signal RF is raised at the mark-recorded portions in the disk 100 as the embodiment of the present invention. That is, when the code "0" is assigned to the sub data in this case, the value of the reading signal RF will be increased a little only at odd predetermined-length lands. Also, when the code "1" is assigned to the sub data, the value of the reading signal RF will be increased a little only at even predetermined-length lands.

That is to say, the result of the "odd–even" subtraction in this case will be positive correspondingly to the code "0" while it will be negative correspondingly to the code "1".

Note that the construction of the player 1 explained above with reference to FIG. 9 is such that the code "0" will be detected when the result of the "odd–even" subtraction is "negative" while the code "1" will be detected when the result of the "odd–even" subtraction is "positive". Thus, in case marks are recorded so that the reading signal level will be raised at the mark-recorded portions as in this example, a code opposite to a conventional one will be recorded as sub data.

Based on the characteristic with which the reading signal level will be raised at the mark-recorded portions in an authenticated disk but will be lowered at the mark-recorded portions in a counterfeit disk produced based on the authenticated disk, the player will be able to judge which a disk loaded in the player is, an authenticated disk 100 or a counterfeit disks produced based on the authenticated disk 100.

The player 1 capable of judging, based on the characteristic of the disk 100 as the embodiment of the present invention, whether a loaded disk is a counterfeit disk produced based on the authenticated disk 100 is constructed as will be described below.

The player 1 as an embodiment of the present invention is a version having previously been described with reference to FIG. 9 and which additionally includes the inversion circuit 15 and judging circuit 16 enclosed in a dashed-line block.

The inversion circuit 15 is supplied with the value of sub data detected by the sub data detection circuit 13. The inversion circuit 15 inverts the polarity of the supplied sub data, and supplies it to the ECC circuit 14.

When the disk 100 as the embodiment of the present invention is played in the player 1, the sub data detected by the sub data detection circuit 13 will have a level which is opposite to a conventional one as having previously been described. This is because the sub data detection circuit 13 is designed to detect the code "0" when the result of "odd–even" subtraction is "negative" and the code "1" when the result of "odd–even" subtraction is "positive". Thus, the sub data detected by the sub data detection circuit 13 will be opposite in level to the sub data recorded at the sub data recorder 50.

Thus, the inversion circuit 15 inverts the sub data value as above to provide the same sub data value as having been recorded by the sub data recorder 50. That is, the player 1 including the inversion circuit 15 can detect the same sub data value as having been recorded from the authenticated disk 100 as the embodiment of the present invention.

In case the sub data is read from a counterfeit disk produced based on the authenticated disk 100 by physically transcribing the substrate of the authenticated disk 100, the sub data value detected by the sub data detection circuit 13 will have a non-inverted pattern while the sub data value provided from the inversion circuit 15 will have an inverted one of the pattern of the sub data value initially recorded.

Thus, no correct sub data value can be read from any counterfeit disk produced based on the authenticated disk 100.

Since the sub data value having a correct polarity can be read from the authenticated disk 100 as above, the ECC circuit 14 can make accurate error correction of identification information in the sub data. That is, the content of the sub data can accurately be read.

On the contrary, since the sub data value having any incorrect polarity, read from the counterfeit disk, will include an error correction code whose polarity is opposite to a polarity which should authentically be, the ECC circuit 14 cannot make accurate error correction of the sub data. Thus, the content of the sub data (identification information) cannot accurately be read.

Thus, it is possible to determine, based on the result of the error correction by the ECC circuit 14, whether the sub data value has a correct polarity, and it is judged, based on the result of polarity judgment, which the disk loaded in the player 1 is, an authenticated disk 100 or a counterfeit disk produced based on the authenticated disk 100.

The player 1 includes the judging circuit 16 to make the above judgment. Connected to the ECC circuit 14 as shown, the judging circuit 16 can determine whether the error correction has accurately be done in the ECC circuit 14. Based on the result of judgment of whether the error correction has accurately been done, the judging circuit 16 can discriminate between the authenticated disk 100 and a counterfeit disk produced based on the authenticated disk 100.

Further, according to the present invention, when the loaded disk has been judged, based on the result of judgment from the judging circuit 16, to be a counterfeit disk, the identification information read from the disk is transferred to the host computer 6. As will be described later, the host computer 6 sends the identification information to the managing server 70 via the network interface 7. Thus, the identification information will be sent as identification information for a disk distributed as a counterfeit disk.

However, if the loaded disk is judged to be a counterfeit one, it means that the ECC circuit 14 did not provide correct identification information. That is, no identification information can be provided to inform that the loaded disk is a counterfeit one.

On this account, the judging circuit 16 converts the sub data value detected by the sub data detection circuit 13 into sub data value having a correct polarity correspondingly to the judgement of the loaded disk as a counterfeit disk, and the sub data value is error-corrected again by the ECC circuit 14 to reproduce the identification information.

The judging circuit 16 effects the above operations as will be described below with reference to the flow diagram shown in FIG. 23.

First in step S301, the judging circuit 16 determines whether the ECC circuit 14 has failed in accurate error correction. Namely, the judging circuit 16 determines whether a correct polarity has been provided as the sub data value detected by the sub data detection circuit 13, and further judges, based on the result of the above determination, which the loaded disk is, an authenticated disk 100 or a counterfeit disk produced based on the authenticated disk 100.

In case the result of determination in step S301 is negative, namely, when the ECC circuit 14 has not failed in accurate error correction, the judging circuit 16 generates a code "1" as a legal bit in step S302.

The legal bit is information indicative of an authenticated disk 100.

Next in step S303, the judging circuit 16 transfers the legal bit generated as above and identification information resulted from the error correction in the ECC circuit 14 to the host computer 6.

With the above operations, the judging circuit 16 will judge the loaded disk to be an authenticated disk 100, and transfer the legal bit "1" indicative of the authenticated disk 100 and identification information to the host computer 6.

In case the result of judgment in step S302 is affirmative, that is, if the judging circuit 16 had determined that the ECC circuit 14 has failed in accurate error correction, the judging circuit 16 goes to step S304 in which it will control the inversion circuit 15 to convert the sub data value to a value having a correct polarity as above.

That is, the judging circuit 16 supplies the sub data value supplied to the ECC circuit 14 to the inversion circuit 15, and instructs the latter to invert the sub data value. It should be reminded here that the polarity of the sub data detected by the sub data detection circuit 13 for a counterfeit disk in the player 1 as the embodiment of the present invention is a non-inverted one and that the polarity is inverted by the inversion circuit 15 to an incorrect one. Therefore, the sub data value not accurately error-corrected as above can be inverted again by the inversion circuit 15 to a value having a correct polarity.

The sub data value supplied to the inversion circuit 15 and inverted in polarity there is supplied to the ECC circuit 14 in which it will be subjected again to the error correction in step S305. In step S306, the judging circuit 16 determines whether the ECC circuit 14 has failed in accurate error correction again in step S305.

In case the result of determination in step S306 is affirmative, namely, if the ECC circuit 14 has failed in accurate error correction, the judging circuit 16 will go to error correction as shown. If the ECC circuit 14 has failed again in accurate error correction, it is highly possible that the sub data itself recorded in the disk is erroneous or the sub data detection circuit 13 has made no correct detection for any reason. In this case, for the error correction, the judging circuit 16 should transfer information of error correction to be done to the host computer 6 so that the latter will correspondingly control the sub data detection circuit 13 to retry detection of the sub data or operate otherwise.

In case the result of determination in step S306 is negative, that is, if the ECC circuit 14 has not failed in accurate error correction, the judging circuit 16 goes to step S307 in which it will generate, for example, a code "0" as an illegal bit. Namely, in case the judging circuit 16 has determined, in step S306 through the control of the inversion circuit 15 (as in step S304) and retry of ECC (as in step S305), that the ECC circuit 14 has not failed in accurate error correction as in step S306, it will be known that the sub data has come from a counterfeit disk in which the reading signal polarity is only inverted. Thus, in step S306, the judging circuit 16 generates an illegal bit indicative of a counterfeit disk.

Then in next step S308, the judging circuit 16 transfer, to the host computer 6, the illegal bit thus generated and identification information resulted from the error correction retried by the ECC circuit 14.

Thus, when the loaded disk is judged to be a counterfeit one, the illegal bit indicative of a counterfeit disk and identification information from the disk are transferred to the host computer 6.

The player 1 will be explained again with reference to FIG. 9. The host computer 6 sends the legal or illegal bit and identification information transferred from the judging circuit 16 to the external managing server 70 via a network interface 7 as shown.

The managing server 70 is to be managed by a copyright manager for main data (content data) to be recorded to the disk 100. Receiving the legal bit from the player 1, the managing server 70 can recognize that the disk loaded in the player 1 is an authenticated disk.

On the other hand, when supplied with the illegal bit from the player 1, the managing server 70 can recognize that the disk loaded in the player 1 is a counterfeit one. Also, referring to the identification information sent along with the illegal bit, the managing server 70 can recognize that counterfeit disks produced based on the disk 100, having the identification information recorded therein, have already been distributed.

Note that although it has been described in the foregoing that the identification information reproduced from the disk 100 is only informed to the external device, the host computer 6 may be arranged to alarm that the loaded disk in the player 1 cannot be read by controlling the player 1 to eject the loaded disk in response to the illegal bit transferred from the judging circuit 16 and displaying a corresponding message on a display (not shown).

Thus, the player 1 will be disabled from reading main data recorded in any counterfeit disk.

As having been described above, the player 1 as the embodiment of the present invention can accurately read the sub data from a disk 100 in which the reading signal level is raised at the mark-recorded portions.

In this case, the inversion circuit 15 is provided to cope with a sub data value detected in an authenticated disk 100 and whose polarity is opposite to a conventional one, whereby identification information can be read as the sub data from the authenticated disk while identification information cannot be read from a counterfeit disk produced based on the authenticated disk.

Also, the judging circuit 16 is provided to cope with a case in which the sub data includes an error correction code for identification information. The judging circuit 16 judges whether the sub data has accurately been error-corrected by the ECC circuit 14, whereby it is possible to discriminate which a disk loaded in the player 1 is, authenticated or counterfeit.

Further, according to the present invention, after the disk loaded in the player 1 is judged by the judging circuit 16 to be a counterfeit disk, the identification information in the disk and illegal bit are sent to the managing server 70, whereby it is possible to inform, to outside, the detection of the counterfeit disk and identification information for the disk 100 based on which the counterfeit disk was manufactured.

Note that the present invention is not limited to the embodiments having been illustrated and described above. For example, it was described for the simplicity of explanation that sub data is represented by codes "0" and "1" by inserting a mark as the sub data on any of adjacent odd and even predetermined-length lands in a set. Actually, however, the positions where the marks are to be inserted may be determined based on another algorithm such as an M-series random number in order to make it difficult for the third party to identify such a pattern of sub data recording.

Also in this case, by defining the method of code representation and a rule for a section to which one bit of the sub code is assigned, common to both the sub data recorder 50 and player 1, the player 1 can accurately read the sub data.

Also, as having been described above, the player as the embodiment of the present invention is designed to judge, based on whether the error correction has accurately been done, whether the sub data value has been detected based on a correct polarity.

However, the determination of whether the sub data value has been detected based on the correct polarity may be effected in many other ways.

For example, a polarity judging bit is inserted in a predetermined bit position of a predetermined sub data. In case the disk loaded is an authenticated one, the bit in the predetermined position will be detected based on a correct value (polarity). Since the polarity in a counterfeit disk is opposite to that in the authenticated disk, the player 1 can judge the disk to be a counterfeit disk by examining the bit value thus inserted.

Also, according to the present invention, the similar sub data detection circuit 13 to the conventional one is provided in the player 1, so that the sub data value recorded in the authenticated disk 100 will have a pattern opposite to a conventional one. To cope with the inverted pattern, the inversion circuit 15 is provided to detect a correct polarity of the sub data value in the authenticated disk. This is advantageous in which the conventional sub data detection circuit 13 can be used as it is without any modification.

In this case, however, to acquire the correct polarity from the authenticated disk, it is also possible to record, to the disk 100, sub data whose polarity has been inverted in advance. In this player 1, since the sub data detection circuit 13 can detect the correct polarity (that is, the same polarity as when the sub data was recorded) in the authenticated disk 100, so there will not be required the inversion circuit 15 which always inverts the polarity of the sub data value detected by the sub data detection circuit 13.

Figure 23:
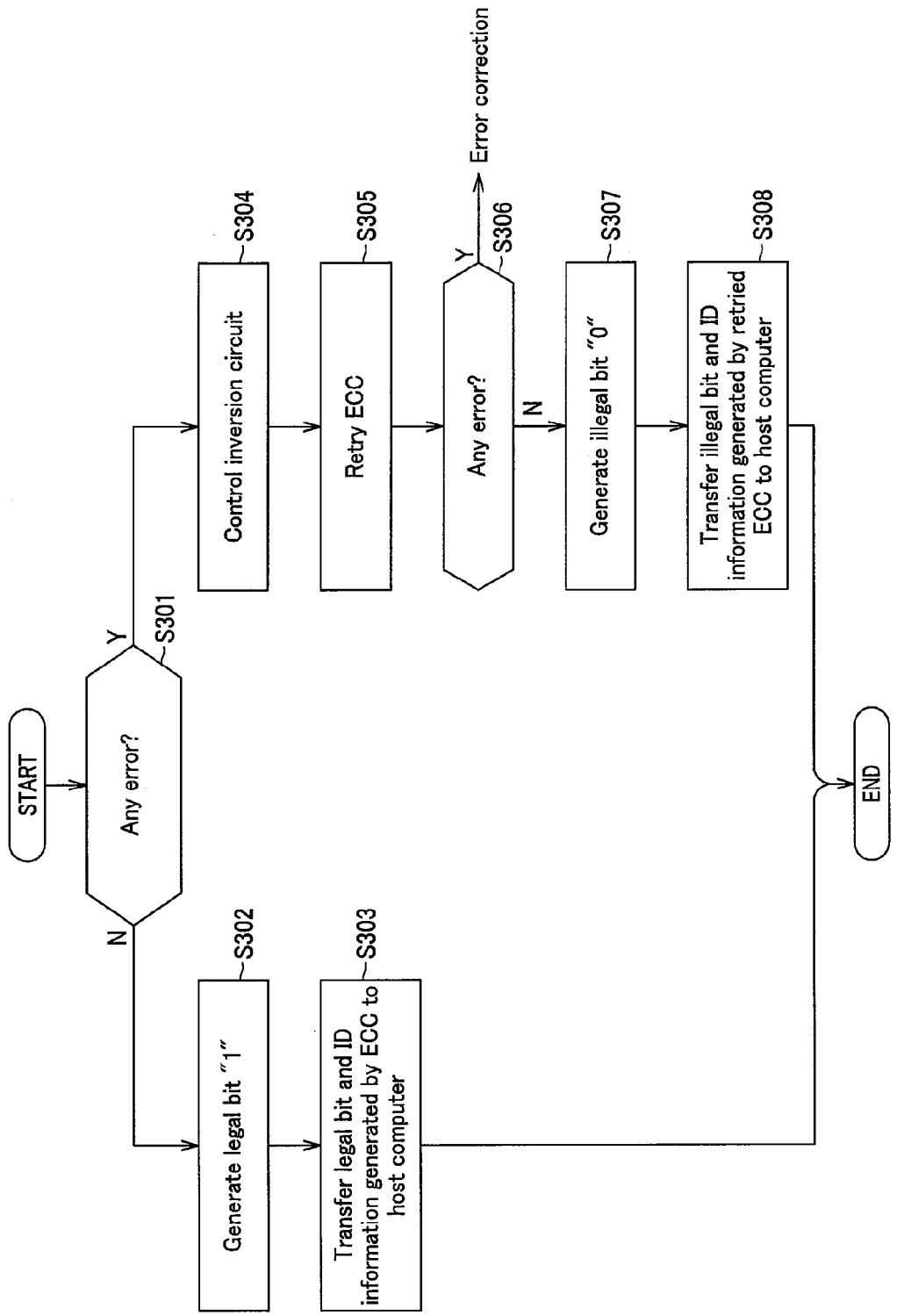
FIG. 23 shows a flow of operations made in a judging circuit included in the player as the embodiment of the present invention.

However, as will be seen from the flow diagram in FIG. 23, to inform the identification information in the counterfeit disk to outside, it is necessary to make error correction by re-inverting the sub data having incorrect polarity, read from the counterfeit disk. To this end, an inversion circuit has to be provided.

Also, in case the conventional sub data detection circuit 13 is to be modified, the procedure for detecting the sub data may be reversed. More specifically, there are conceivable two methods. The first method is such that the code "0" is detected in response to a "positive" value of the result of "odd–even" subtraction and code "1" is detected in response to a "negative" value of the result of "odd–even" subtraction.

As the second method, the code "0" is detected in response to a "negative" value of the result of "odd–even" subtraction and code "1" is detected in response to a "positive" value of the result of "odd–even" subtraction.

Also in this case, since a correct polarity is detected by the sub data detection circuit 13 from the authenticated disk 100, there is not required the inversion circuit 15 which always inverts the polarity of the sub data value detected by the sub data detection circuit 13.

Also, the ROM disk conforming to the Blue-Ray Disk (trademark) standard was cited as an example of the disk 100 as the embodiment of the present invention, in which the reading signal level is raised at the mark-recorded portions.

However, the playing apparatus and method according to the present invention are widely applicable to optical-disk recording media such as an "optical-disk recording medium including a substrate and at least a reflective layer and cover layer stacked on the substrate and to which main data is recorded in the form of a combination of pits and lands formed on the substrate and sub data is recorded in the form of marks formed on the reflective layer by irradiating laser light having a writing power" and in which the reading signal level will be raised at the mark-formed portions but will be lowered at the mark-formed portions in an optical-disk recording medium produced by physically transcribing the shape of the substrate of the above optical-disk recording medium.

Also, in the aforementioned embodiment, the polarity of the sub data is determined based on the result of subtraction of the value of the reading signal at the mark-recorded portions from that of the reading signal where no marks are recorded (having been referred to as 'result of "odd–even" subtraction' in the foregoing). However, the reading signal level where no marks are recorded may be fixed to a certain value, and the polarity be determined based on the result of subtraction of the reading signal level at the mark-recorded portions from the fixed value. It should be noted that the fixed value should be set correspondingly to the length of the lands where the marks are to be recorded.

In the aforementioned embodiments, it is judged which the value of the sub data is, "0" or "1", on the basis of whether the result of subtraction (also including an integrated value of subtraction result) of the reading signal level at the mark-recorded portions from that (also including the above fixed value) where no marks are recorded is, positive or negative, that is, with reference to a threshold (=0). With consideration given to the rise of the reading signal level at the mark-recorded portions in the authenticated disk, however, the sub data value can be judged based on a predetermined threshold whose absolute value is larger than the "0" as well as on the threshold (=0). That is, in case the result of subtraction (including an integrated value of the subtraction result) of the reading signal level at the mark-recorded portion from that (also including the aforementioned fixed value) where no marks are recorded exceeds a threshold which a positive value larger than the "0", it is judged whether the sub data value is "1". In case the result of subtraction is smaller than a threshold which is a negative value smaller than the "0", it is judged whether the sub data value is "0".

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A playing apparatus for playing an optical-disk recording medium including a substrate having main data recorded in the form of a combination of pits and lands on one side thereof and at least a reflective layer and cover layer stacked on the substrate and to which sub data is recorded in the form of marks so formed on the reflective layer by irradiating writing-power laser light to the reflective layer that the level of a reading signal will be raised at portions where the marks are formed but will be lowered at the mark-formed portions in an optical-disk recording medium produced by physically transcribing the substrate shape of the above optical-disk recording medium, the apparatus comprising:

a reading signal generating means for generating the reading signal by detecting a return part, from the optical-disk recording medium, of reading-power laser light having been irradiated to the optical-disk recording medium;

a sub data detecting means for detecting the level of the sub data on the basis of the result of sampling the reading signal generated by the reading signal generating means at a predetermined sampling point; and a judging means for judging, based on a result of determining whether the value of the sub data detected by the sub data detecting means has a correct polarity, whether the optical-disk recording medium is a authenticated disk, wherein the sub data includes identification information unique to each optical-disk recording medium and an error correction code for error correction of at least the identification information, the apparatus further comprising:

a polarity inverting means for inverting the polarity of the value of the sub data detected by the sub data detecting means;

an error correcting means for making error correction of the substantial data on the basis of the error correction code included in the sub data supplied from the polarity inverting means; and a sending means for sending specific information to an external device via a required network, the judging means being designed to determine, by determining whether the error correcting means has made the error correction accurately, whether the detected sub data value has a correct polarity, to thereby judge whether the optical-disk recording medium is a authenticated one, and to supply, in case the optical-disk recording medium has been judged not to be any authenticated one, the value of the sub data once inverted by the polarity inverting means to the inverting means, and then have the error correcting means retry the error correction, to thereby supply the identification information resulted from the retried error correction to the sending means; and the sending means sending the identification information supplied from the judging means as the specific information to the external device.

2. The apparatus according to claim 1, wherein the sub data include substantial data having a required data content and an error correction code for error correction of at least the substantial data, the apparatus further comprising:

a polarity inverting means for inverting the polarity of the value of the sub data detected by the sub data detecting means; and an error correcting means for making error correction of the substantial data on the basis of the error correction code included in the sub data supplied from the polarity inverting means, the judging means being designed to determine, by determining whether the error correcting means has made the error correction accurately, whether the detected sub data value has a correct polarity.

3. The apparatus according to claim 1, wherein the sub data detecting means detects the sub data on the basis of a difference, detected at the predetermined sampling point, between the reading signal value at the mark-recorded portions and that where no marks are recorded.

4. The apparatus according to claim 1, wherein the sub data detecting means determines a difference, detected at the predetermined sampling point, between the reading signal value at the mark-recorded portions and that where no marks are recorded, and detects the value of the sub data on the basis of an integrated value of the difference.

* * * * *